(12) United States Patent
Tanabiki et al.

(10) Patent No.: US 7,428,992 B2
(45) Date of Patent: Sep. 30, 2008

(54) SECURE DEVICE AND SYSTEM FOR ISSUING IC CARDS

(75) Inventors: Masamoto Tanabiki, Kanagawa (JP); Mitsuhiro Sato, Kanagawa (JP); Yasuo Takeuchi, Tokyo (JP); Emi Tsurukiri, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 58 days.

(21) Appl. No.: 10/598,661

(22) PCT Filed: Jan. 10, 2006

(86) PCT No.: PCT/JP2006/000146

§ 371 (c)(1),
(2), (4) Date: Oct. 19, 2006

(87) PCT Pub. No.: WO2006/075576

PCT Pub. Date: Jul. 20, 2006

(65) Prior Publication Data

US 2007/0136797 A1    Jun. 14, 2007

(30) Foreign Application Priority Data

Jan. 11, 2005   (JP) .............................. 2005-003596

(51) Int. Cl.
*G06K 7/06* (2006.01)
(52) U.S. Cl. .................. 235/441; 235/375; 235/380; 235/492; 726/6

(58) Field of Classification Search .............. 235/441, 235/492, 380, 382, 382.5, 375, 439; 726/6
See application file for complete search history.

(56) References Cited

U.S. PATENT DOCUMENTS

| | | | | |
|---|---|---|---|---|
| 5,592,619 A * | 1/1997 | Shona | ........................ | 726/32 |
| 5,923,884 A * | 7/1999 | Peyret et al. | ................ | 717/167 |
| 6,742,117 B1 * | 5/2004 | Hikita et al. | ................ | 713/172 |
| 7,165,727 B2 * | 1/2007 | de Jong | ..................... | 235/492 |
| 2002/0174337 A1 | 11/2002 | Aihara | ....................... | 713/172 |
| 2003/0177392 A1 * | 9/2003 | Hiltgen | ....................... | 713/201 |
| 2004/0162932 A1 * | 8/2004 | Mizushima et al. | ......... | 711/103 |

FOREIGN PATENT DOCUMENTS

| | | |
|---|---|---|
| JP | 11-250204 | 9/1999 |
| JP | 2000-330779 | 11/2000 |
| JP | 2003-067679 | 3/2003 |
| JP | 2003-108384 | 4/2003 |
| JP | 2002-329180 | 11/2003 |

* cited by examiner

*Primary Examiner*—Edwyn Labaze
(74) *Attorney, Agent, or Firm*—Greenblum & Bernstein, P.L.C.

(57) ABSTRACT

A secure device capable of reducing influences by interruptions of communication with an external device and allowing a user to install a desired application program speedily and safely. Command storage section (106) of this secure device (100) stores command groups for executing card issuance. Card issuance section (104) extracts a series of card issuance commands corresponding to a function of a card to be acquired from the command group stored in command storage section (106) and writes the commands into a buffer of card management section (102), Card management section (102) executes each card issuance command written by card issuance section (104). Card issuance is completed through internal processing of secure device (100).

20 Claims, 29 Drawing Sheets

| FILE NAME | FILE PATH | FILE IDENTIFICATION INFORMATION | FILE SIZE | DIRECT ACCESSIBILITY FLAG | ADDRESS |
|---|---|---|---|---|---|
| File_1 | Root/ | 1 | a | true | **** |
| File_2 | Root/dir1 | 2 | b | true | △△△△ |
| | | | | | |

FIG.11

| STATUS WORD | RESULT |
|---|---|
| 9000h | SUCCESS |
| OTHER THAN 9000h | FAILURE |

| NUMBER OF PRECEDING COMMANDS | ERROR PROCESSING |
|---|---|
| 1 | × × × |
| 2 | △ △ △ |
| ⋮ | ⋮ |
| n | TRANSMIT CLEAR COMMAND TO CARD |

454

FIG.25 understand# SECURE DEVICE AND SYSTEM FOR ISSUING IC CARDS

TECHNICAL FIELD

The present invention relates to a secure device represented by an IC (Integrated Circuit) card and an IC card issuance system made up of the secure device and an external device represented by a portable terminal which is connected to and communicating with the secure device, and more particularly, to a secure device that performs card issuance processing by receiving an instruction from an external device connected thereto and communicating therewith and an IC card issuance system.

BACKGROUND ART

An IC card is currently becoming a focus of attention as a secure device. There are IC cards that simply store data and ones that actually come with an OS (Operating System). As examples of use of an IC card, there are various types of IC cards, such as a contact type IC card represented by a credit card and ETC (Electronic Toll Collection System) card, non-contact type IC card represented by a traffic system card and electronic money card, and it is expected that the development of new application fields and expansion in scale of application fields will be further promoted in the future.

On the other hand, the development of a multi-application card capable of downloading an application after card issuance is being carried forward aiming at improving convenience for users and reducing barriers to entering into the market by new service providers of IC cards.

Furthermore, a technology for mounting a secure device such as an IC card on a mobile device such as a portable terminal and downloading an application or using an application through the mobile device is proceeding toward practical utilization.

Here, the hardware configuration of an IC card will be explained using FIG. 1. FIG. 1 is a functional block diagram about the hardware of an IC card.

IC card 10 is provided with CPU (Central Processing Unit) 11, ROM (Read Only Memory) 12, volatile memory (example: RAM: Random Access Memory) 13, volatile memory (example: EEPROM: Electrically Erasable Programmable Read Only Memory) 14 and I/O IF 15.

CPU 11 carries out operations. ROM 12 is a read-only memory which is not rewritable. The contents stored in ROM 12 are determined at the time of manufacturing the IC card and cannot be changed later. RAM 13 is a readable/writable memory. EEPROM 14 is designed to maintain its contents even when power is turned off. I/O IF 15 is responsible for data exchange between IC card 10 and the outside. A program executed by CPU 11 is usually called an "application." Codes for executing the application are stored in ROM 12 and EEPROM 14. When IC card 10 is subjected to encryption operation, IC card 10 is further provided with an encryption coprocessor in addition to the configuration shown in FIG. 1.

Between the application installed in IC card 10 and the outside (reader), data is exchanged using, for example, an APDU (Application Protocol Data Unit) which is a format defined by ISO/IEC7816-4. The APDU is made up of two components; a command message given from the reader to the IC card and a response message returned from the IC card to the reader.

The format of an APDU command will be explained using FIG. 2. FIG. 2 illustrates an example of the format of an APDU command.

APDU command 20 in FIG. 2 is made up of header 21 and body 22. Header 21 is made up of a class (CLA), instruction (INS) and parameters (P1, P2). Body 22 is made up of a field length of command data (Lc: Length of Command Data), data section and field length of response data (Le: Length of Expected Data). The capacity of the APDU command 20 is 1 byte for CLA, INS, P1, P2, Lc, Le each and 255 bytes for the data section, a total of 261 bytes at maximum.

A scheme for creating an APDU will be explained using FIG. 3. FIG. 3 is a conceptual diagram showing a scheme to divide data and create an APDU.

As described above, the capacity of one APDU command 20 is as small as 261 bytes, and therefore in order to send data that amounts to several K bytes when downloading an application, the sending data needs to be divided into a plurality of APDU blocks. The parameters (P1, P2) of each APDU block indicate a block number and whether or not there is any block that follows, and can thereby allow the IC card side to check consistency in the order of commands sent and the necessity for final processing.

Furthermore, an expansion whereby Lc is expressed in 3 bytes with the first byte indicating 3-byte notation and second byte and third byte indicating a data length is proposed, but there are extremely few examples of such mounting from the standpoint of memory capacity of an IC card.

For a device having a small memory capacity such as an IC card, an input buffer for storing received commands generally cannot have a large size. When an explanation is made using multi-application card, a certain area is permanently designated as an input buffer and shared among applications, and the memory capacity secured is thereby limited. The multi-application card updates "current AP information indicating a currently selected application" when an application is selected, refers to the current AP information when the next command is received, and can thereby reliably pass the command to the selected application.

The application is downloaded through a card manager. The card manager is an application in the multi-application card that manages the card and applications inside the card. "Management of card" refers to card issuance that stores IDs and keys necessary for a card issuer to manage the card in the card and causing the card after issuance to transition to locked state or terminated state. Furthermore, "management of application" refers to downloading and deleting of the application.

Furthermore, there is recently a proposal of a device which can use a large capacity memory from an IC chip as an IC card extended memory protection area (hereinafter referred to as "secure memory card") and meet the need for an increase in capacity of IC card application data. Since the secure memory card can be adapted to the size of a mobile device, there is an expectation for its development into use in EC (Electronic Commerce) services using a mobile device with the secure memory card directly inserted into a slotted mobile device.

When a mobile device is used, communication is interrupted when located outside a radio wave range, which results in an increase in the likelihood of affecting the behavior of the card. Thus, when communication is interrupted, repetition processing such as doing downloading over again from the beginning or performing resending in mid-flow is proposed.

An example of such an IC card application program loading technology is disclosed in Patent Document 1. FIG. 4 is a block diagram of an IC card application program loading apparatus disclosed in Patent Document 1.

In FIG. 4, host computer 30 stores an application program, applies predetermined encryption processing (RSA: Rivest-Shamir-Adleman) to an application program and provides the application program as a divided component to IC card 50 through terminal apparatus 40. When the communication with host computer 30 is interrupted and exchange of data such as an application program is interrupted, IC card 50 sends a resending request for data other than the successfully received part to host computer 30. Then, when all components are received, these components are integrated, subjected to decoding processing and error detection processing. On the other hand, if the request is not successfully received even when a resending request is sent a predetermined number of times, sending of the resending request is stopped and the data successfully received and stored so far is erased.

Patent Document 1: Unexamined Japanese Patent Publication No. 2003-108384

DISCLOSURE OF INVENTION

Problems to Be Solved by the Invention

However, the IC card application program loading technology described in Patent Document 1 has the following problems.

First, since data necessary for downloading of an application program needs to be repeatedly sent/received between the host computer and IC card, there is a problem that when the communication between both parties is interrupted for some reason, it is not possible to avoid influences on downloading and that the possibility of influencing the behavior of the IC card increases. Especially, with an increasing memory capacity of a secure device, high function applications are expected in the future and the application itself tends to become enormous and the number of APDU blocks is consequently expected to increase accordingly. Such an increase in the number of APDU blocks means an increase in a downloading time and means an increase in the possibility that communication may be interrupted by the time the downloading is completed. Furthermore, when communication is interrupted, even if repetition processing such as doing downloading over again from the beginning or performing resending in mid-flow is performed, the complexity of the system and card processing due to repetition processing such as repeated resendings caused by failures during resending and user stress caused by an increase in the downloading time are considered, and there is a demand for a scheme which can minimize influences of communication interruption.

Second, the IC card is a passive device and has a problem that it can perform nothing more than incorporating an application program given from the host computer and operating as instructed by this program. That is, the application itself of the IC card to be used is originally stored in an external device connected to the IC card (host computer in this case) and therefore the range of applications that can be selected by the user is limited and lacking in convenience in card issuance and application downloading.

Third, the host computer applies predetermined encryption processing to the application program and sends it to the IC card, which results in a problem that the IC card requires processings such as decoding and verification. As described above, the processing capacity of the IC card is not high, and therefore a scheme capable of processing all data in the form of plain text or reducing the number of decodings and verifications are performed while securing the conventional security is desirable.

Fourth, there is another problem that in order to share a session key between the host computer and IC card when downloading an application program or issuing a card and perform encryption of APDU blocks to be sent to the IC card using the session key and MAC (Message Authenticate Code) verification, it is necessary to know the APDU blocks which are original data. There are actually cases where an author of the APDU blocks and the provider who performs downloading of the application program and card issuance are separated from each other, and therefore when the APDU blocks include highly confidential information such as personal information, a scheme preventing the provider who performs downloading of the application program and card issuance from knowing the contents of the APDU blocks is expected.

The present invention is implemented in view of such problems and it is an object of the present invention to provide a secure device capable of reducing influences of interruption of communication with an external device and allowing a user to speedily and safely incorporate a desired application program.

Means for Solving the Problem

The secure device according to the present invention adopts a configuration including a card issuance section that extracts a card issuance command corresponding to a function of a card to be acquired from command groups stored in an internal memory and a card management section that executes the card issuance command extracted by the card issuance section.

The IC card issuance system according to the present invention is an IC card issuance system comprising a secure device and an external device that communicates with this secure device, wherein the external device comprises a command generation section that generates a request command for requesting card issuance and a command sending section that sends the request command to the secure device, and the secure device comprises a card issuance section that extracts a card issuance command corresponding to a function of a card to be acquired from command groups stored in an internal memory and a card management section that executes, when the request command is input, the card issuance command extracted by the card issuance section.

Advantageous Effect of the Invention

According to the present invention, it is possible to implement the high speed of data processing between the external device and secure device (e.g., downloading of an application program and card issuance) by reducing the number of communications are carried out between the external device and secure device and reducing the security processing load inside the secure device while securing conventional security. Furthermore, the present invention allows the user to incorporate a desired application program into the secure device. Furthermore, it is possible to technologically implement information protection which has been implemented so far by means of contracts between a plurality of providers involved in downloading of application programs and card issuance.

BRIEF DESCRIPTION OF DRAWINGS

FIG. 11 illustrates an example of a file management table;

FIG. 16(A) illustrates an example of reporting a response from the card management section to the card issuance section, FIG. 16(B) illustrates another example of reporting a response from the card management section to the card issuance section;

FIG. 25 illustrates an example of a progress management table;

BEST MODE FOR CARRYING OUT THE INVENTION

Now, embodiments of the present invention will be described in detail with reference to the accompanying drawings. The present invention is not limited to these embodiments and can be implemented in various modes within a range without departing from the essence thereof.

Furthermore, a "secure device" in a broad sense means a device in general equipped with a chip having an application which has functions such as an authentication function, payment function and VPN (Virtual Private Network) or the like. The following embodiment will explain a case where a multi-application card is adopted as an example of the secure device, "Card issuance" means both issuance of a card itself having an application and downloading of an application to an issued card. The embodiment below will explain both cases as examples of card issuance.

Embodiment 1

Figure 1:
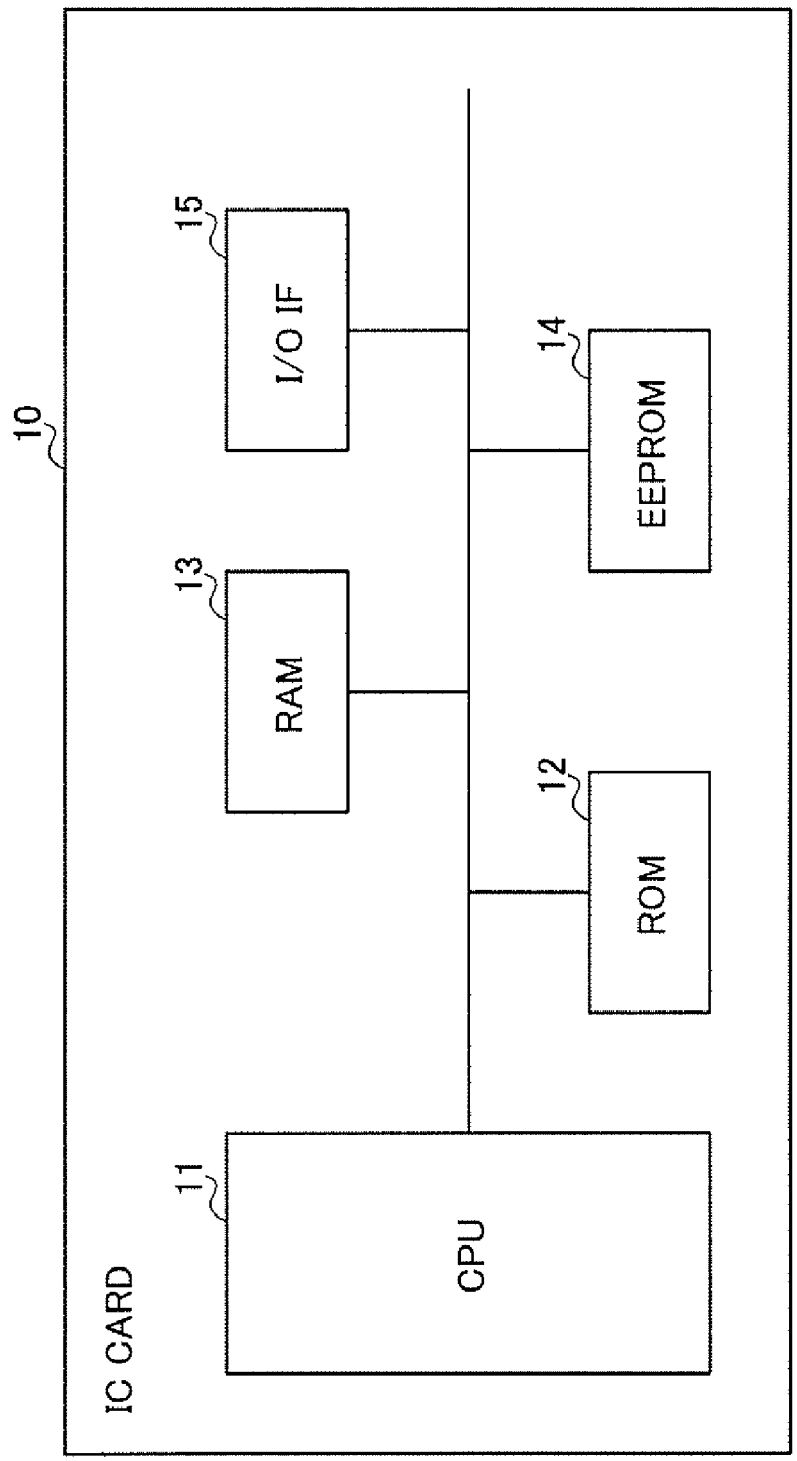
FIG. 1 is a functional block diagram related to hardware of an IC card.
Figure 2:
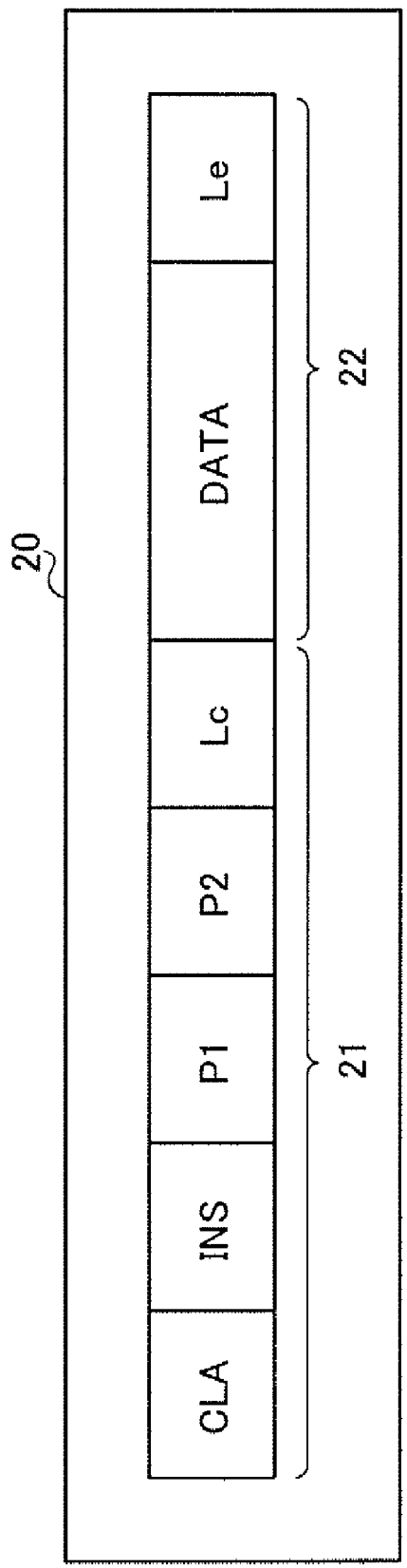
FIG. 2 illustrates an example of the format of an APDU command.
Figure 3:
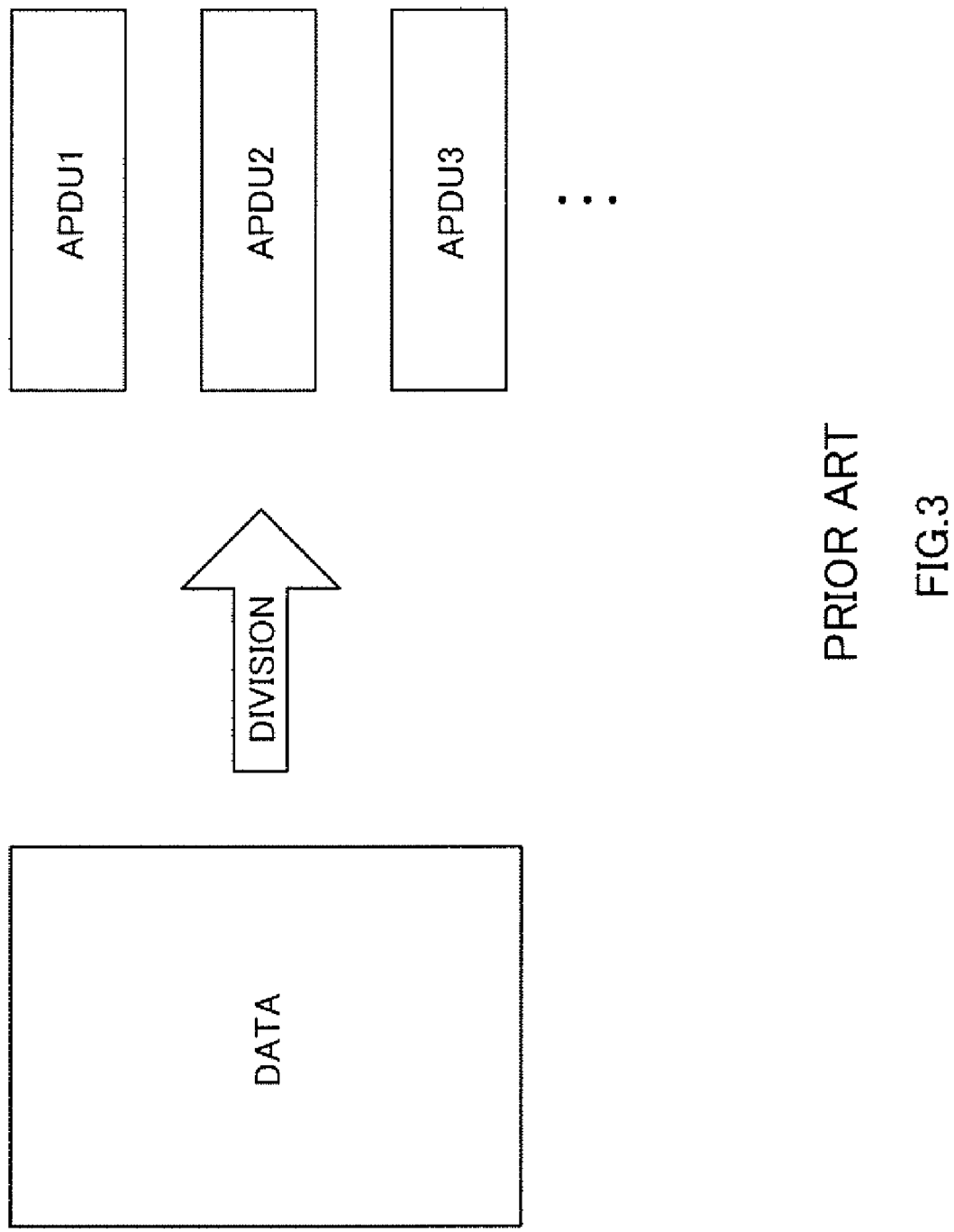
FIG. 3 is a conceptual diagram showing a scheme of creating APDUs by dividing data.
Figure 4:
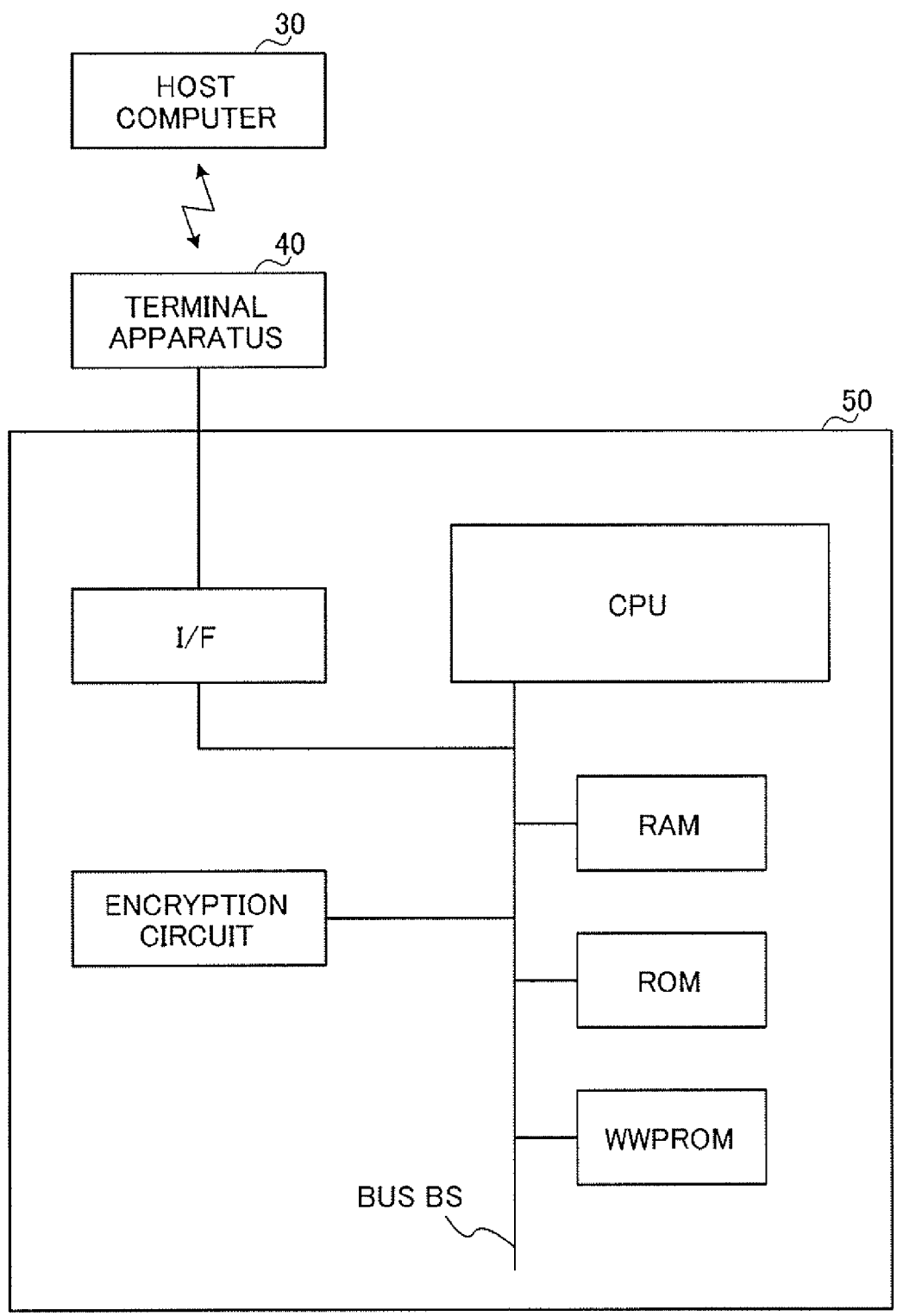
FIG. 4 is a block diagram showing the configuration of a conventional IC card application program loading apparatus.
Figure 5:
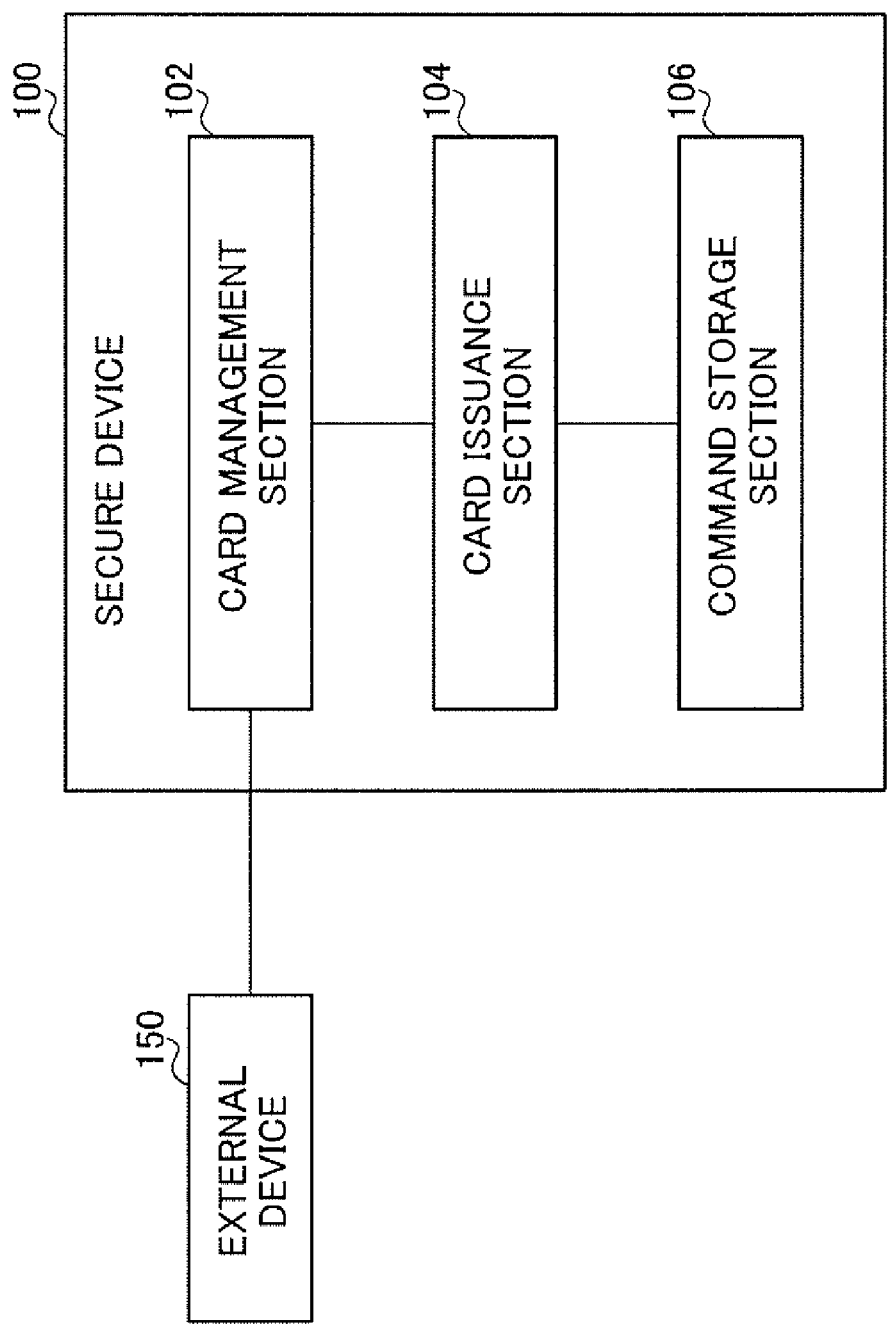
FIG. 5 is a block diagram showing the configuration of a secure device according to Embodiment 1 of the present invention.

FIG. 5 is a block diagram showing the configuration of secure device 100 according to Embodiment 1 of the present invention.

In FIG. 5, secure device 100 is provided with card management section 102, card issuance section 104 and command storage section 106.

Card management section 102 communicates with external device 150 which will be described later to send/receive various commands such as an application program, control signal or the like. Furthermore, card management section 102 manages the operation of secure device 100 by maintaining IDs and keys necessary to issue cards and if required, making issued cards transit to locked state or terminated state. Furthermore, card management section 102 decides whether or not to accept a request for direct access from external device 150 which will be described later.

Card management section 102 has a function of managing downloading of an application program (card manager). More specifically, card management section 102 executes each card issuance command written by card issuance section 104. Card management section 102 then sends a response which is a result showing whether or not the card issuance has been successful to external device 150.

Card issuance section 104 selects and extracts a series of card issuance commands corresponding to the function of a card to be acquired from command groups stored in command storage section 106. Furthermore, card issuance section 104 copies each command from the series of card issuance commands in an APDU buffer (not shown) of card management section 102 in turn.

Command storage section 106 is an internal memory for storing command groups to execute card issuance. Command groups stored in command storage section 106 may be stored (preinstalled) in secure device 100 at the time of purchase or may be written from external device 150 and inserted (installed) after purchase. That is, it is possible to freely change, add or delete command groups stored in command storage section 106 according to the use or capacity of secure device 100. Furthermore, command storage section 106 has a secure area for storing data which puts together APDU issuance commands which are a series of card issuance commands written by direct access from external device 150.

Command storage section 106 can store a plurality of card issuance command groups corresponding to plural card functions. A series of card issuance commands corresponding to the functions of the respective cards are stored in a file as a simultaneous command which will be described later. Furthermore, the file storing this simultaneous command can be identified by a file name and/or file ID.

Figure 6:
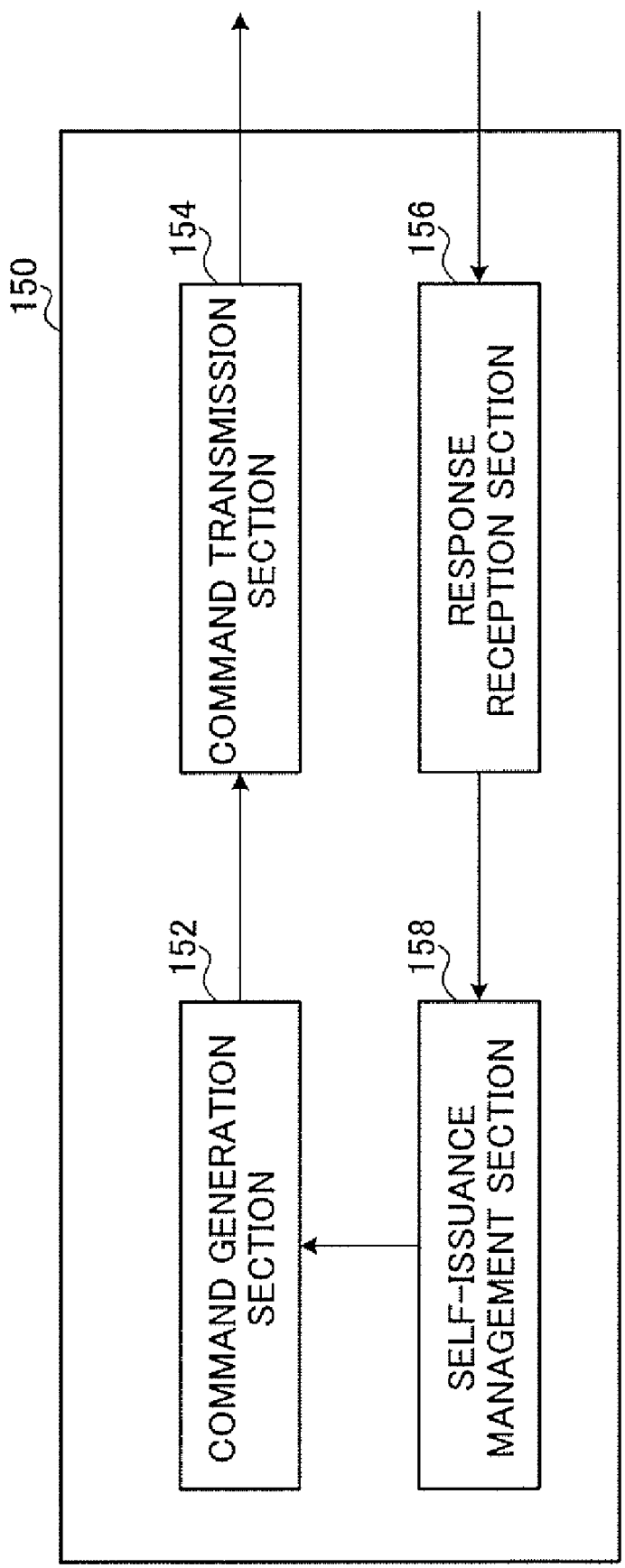
FIG. 6 is a block diagram showing the configuration of the external device in FIG. 5.

Next, the configuration of the external device in FIG. 5 will be explained using FIG. 6. FIG. 6 is a block diagram showing the configuration of external device 150 in FIG. 5.

In FIG. 6, external device 150 is provided with command generation section 152, command sending section 154, response reception section 156 and self-issuance management section 158.

Command generation section 152 generates various commands to be exchanged with card management section 102. Especially, command generation section 152 generates a self-issuance start command which is a card issuance request to secure device 100 under the instruction of self-issuance management section 158. The self-issuance start command generated by command generation section 152 is output to card management section 102 through command sending section 154.

Command sending section 154 outputs the self-issuance start command generated by command generation section 152 and other various commands to card management section 102.

Response reception section 156 receives a response from card management section 102 indicating whether or not card issuance has been successful. The response received by response reception section 156 is output to self-issuance management section 158.

Self-issuance management section 158 controls generation and sending of self-issuance start commands inside external device 150. More specifically, self-issuance management section 158 requests command generation section 152 to issue a self-issuance start command. Furthermore, upon receiving a response indicating whether or not the card issuance has been successful from response reception section 156, self-issuance management section 158 analyzes the response and determines the next operation of external device 150.

When, for example, self-issuance management section 158 receives a response that the card issuance has been successful, it outputs an instruction for ending the processing by external device 150. Furthermore, in the case where an application program downloaded by the card issuance cannot be used until secure device 100 is reported again that the card issuance has been successful, self-issuance management section 158 requests command generation section 152 to issue a "card usage authorization confirmation command."

On the other hand, upon receiving a response that the card issuance has failed, self-issuance management section 158 instructs command generation section 152 to re-generate and resend a self-issuance start command or stop card issuance.

The operation of secure device 100 configured as shown above will be explained in detail using FIG. 7.

Figure 7:
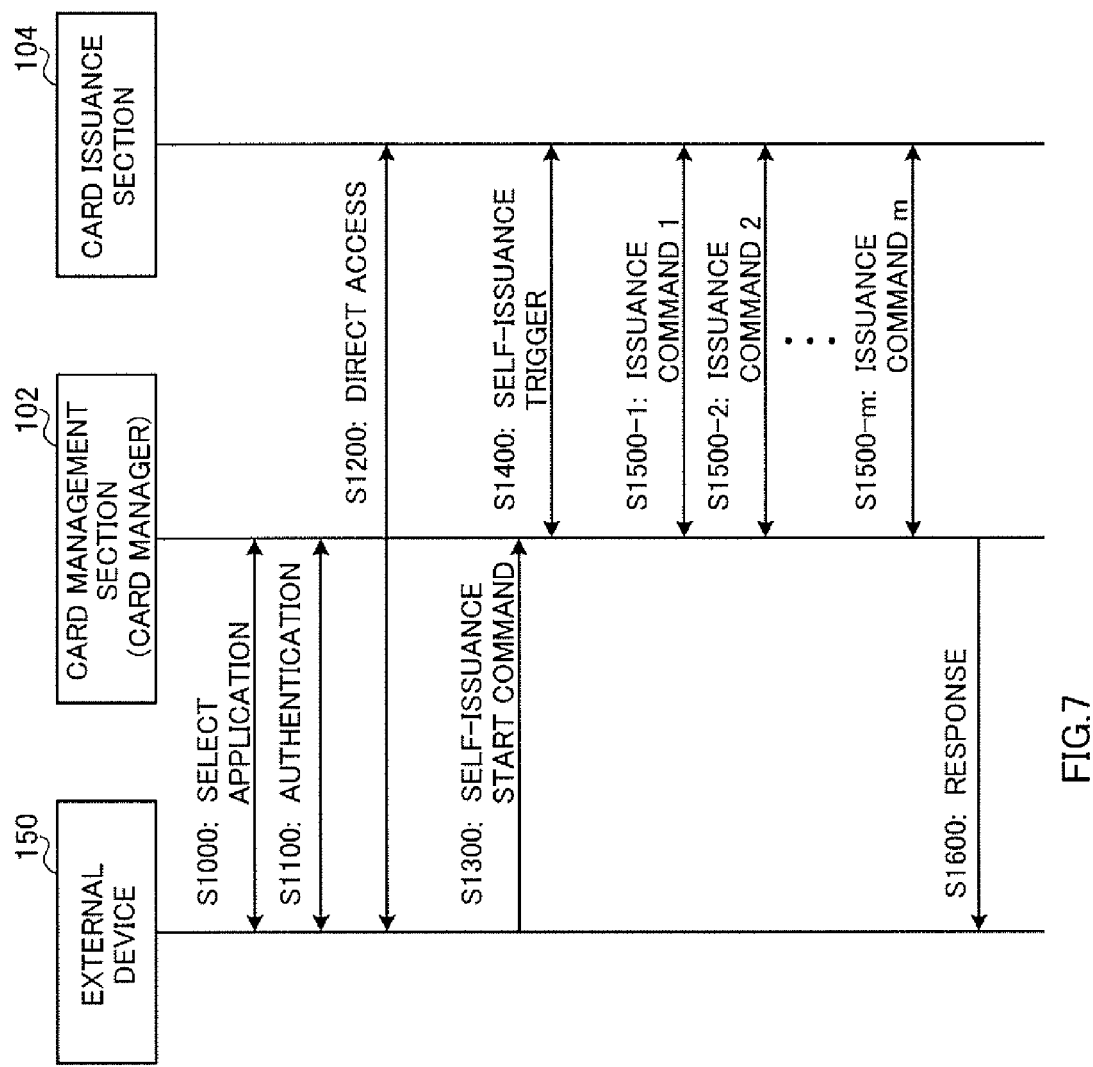
FIG. 7 is a sequence diagram showing processing by the external device, card management section and card issuance section according to Embodiment 1 of the present invention.

FIG. 7 is a sequence diagram showing processing by external device 150, card management section 102 and card issuance section 104 according to Embodiment 1 of the present invention. The example in FIG. 7 shows a case where an APDU issuance command which has been written from external device 150 is processed to download an application program.

In step S1000, an application to be used between external device 150 and card management section 102 is selected. More specifically, external device 150 sends a command to select a card manager (=application used for card issuance) to card management section 102. Next, when card management section 102 receives a command from external device 150 and successfully selects a card manager, "current AP information" indicating an AP currently selected is updated in card management section 102 and upon receiving the next command, the updated "current AP information" is referred to. In this way, the next command can be passed to card management section 102.

In step S1100, mutual authentication processing is performed between external device 150 and card management section 102. More specifically, one or both external authentication whereby secure device 100 authenticates external device 150 and internal authentication whereby external device 150 authenticates secure device 100 is/are performed according to the required security level.

It should be noted that the authentication step in step S1100 is preferably performed when writing highly confidential data, but it can be omitted when writing other data.

In step S1200, external device 150 performs direct access processing to write data which puts together APDU issuance commands for executing downloading of an application program (hereinafter referred to as "simultaneous command") 160 into the secure area of command storage section 106. Simultaneous command 160 written through direct access as described above is saved in a file so as to be identifiable with a file name and file ID and stored in command storage section 106.

At this time, external device 150 cannot read out nor write in commands stored in command storage section 106 unless it is authorized to do so by the application selected in step S1000. Since direct access uses a block transimit protocol which allows writing of several mega bytes data at a time, simultaneous command 160 for downloading the application program can be sent by way of only one time direct access.

Figure 8:
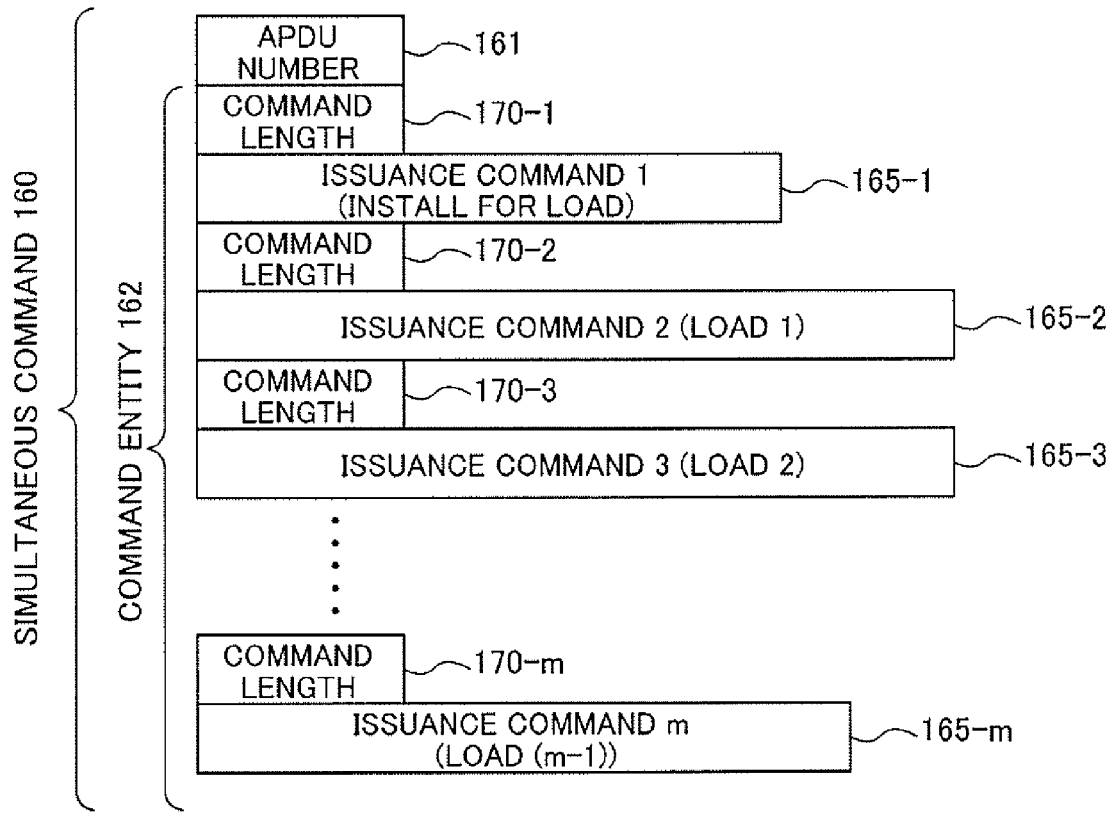
FIG. 8 illustrates an example of the configuration of a simultaneous command.

Here, simultaneous command 160 will be explained using FIG. 8. FIG. 8 illustrates an example of the configuration of simultaneous command 160.

In FIG. 8, simultaneous command 160 is made up of APDU number 161 indicating the number of APDU issuance commands which make up simultaneous command 160 and command entity 162. In the example of FIG. 8, APDU number 161 is m.

Command entity 162 is made up of data consisting of APDU issuance commands 165-1, 165-2, 165-3, . . . , 165-m and command lengths 170-1, 170-2, 170-3, . . . , 170-m indicating with how many bytes each APDU issuance command is formed.

In step S1300, external device 150 sends self-issuance start command 180 which is a card issuance request to secure device 100 to card management section 102. This self-issuance start command 180 is generated by command generation section 152 which has received the issuance request from self-issuance management section 158 and sent through command sending section 154.

"Self-issuance" in the present specification means performing processing each APDU issuance command making up simultaneous command 160 stored in command storage section 106 between card management section 102 and card issuance section 104 and carrying out card issuance. The operations of card management section 102 and card issuance section 104 during self-issuance will be explained in detail in posterior step S1500-1 to step S1500-m.

Figure 9:
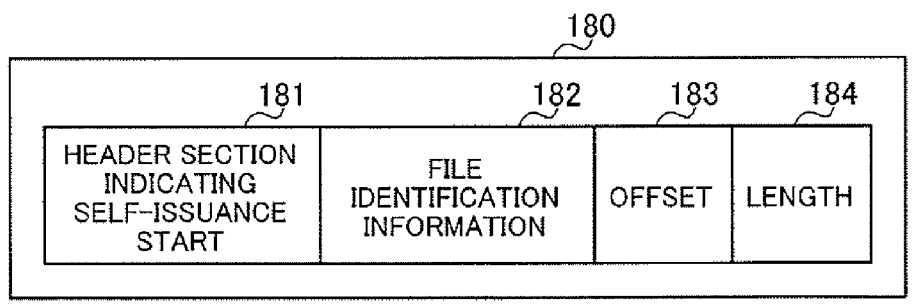
FIG. 9 illustrates an example of the format of a self-issuance start command.

Here, self-issuance start command 180 will be explained using FIG. 9. FIG. 9 illustrates an example of the format of self-issuance start command 180.

In FIG. 9, self-issuance start command 180 is made up of header section 181 to identify a self-issuance start command, file identification information 182, offset 183 and length 184.

File identification information 182 is information to identify a file which saves simultaneous command 160 (e.g., file name and file ID). Offset 183 is information which indicates a read out position in the identified file and length 184 is information which indicates the length of data to be read out.

When default processing is possible for such reasons that a file which saves simultaneous command 160 is uniquely defined, the file name and file ID or the like of file identification information 182 need not to be included.

Card management section 102 cannot receive the next command unless it sends a response after receiving self-issuance command 180. In step S1400, card management section 102 receives self-issuance start command 180 sent in S1300 and outputs a self-issuance trigger to card issuance section 104 as a response to self-issuance start command 180. The self-issuance trigger includes the address of simultaneous command 160, offset 183 and length 184. This self-issuance trigger becomes a trigger to start self-issuance for card issuance section 104. That is, sending/reception of the self-issuance trigger causes processing on each APDU issuance command making up simultaneous command 160 to be started between card management section 102 and card issuance section 104.

In step S1500-1 to step S1500-m, processing on each APDU issuance command making up simultaneous command 160 (self-issuance) is performed between card management section 102 and card issuance section 104.

First, when card issuance section 104 receives the self-issuance trigger from card management section 102, it extracts first APDU issuance command 165-1 (e.g.: Install For Load) specified by command length 170-1 of simultaneous command 160 shown in FIG. 8 and copies it to APDU buffer (not shown) inside card management section 102. At this time, card issuance section 104 increments the "number of preceding commands" managed in card issuance section 104 by 1. The "number of preceding commands" indicates the number of APDU issuance commands making up simultaneous command 160 which have been processed successfully and needs to be set to zero when the self-issuance trigger from card management section 102 is received. The number of preceding commands is stored in a non-volatile storage area such as EEPROM (not shown).

Card management section 102 executes APDU issuance command 165-1 (Install For Load) copied into the APDU buffer and outputs a status word (e.g. 9000h) indicating the successful end as its response to card issuance section 104 (S1500-1) in the case of a successful end.

Next, upon confirming that the status word from card management section 102 indicates a successful end, card issuance section 104 extracts the next APDU issuance command 165-2 (e.g.: Load1) from simultaneous command 160 and copies the next APDU issuance command 165-2 to the APDU buffer in card management section 102. Then, card management section 102 executes APDU issuance command 165-2 (Load1) copied into the APDU buffer and outputs a status word indicating a successful end as its response to card issuance section 104 (S1500-2) in the case of a successful end.

When card issuance section 104 copies the APDU issuance command to the APDU buffer, it is preferable to delete the APDU issuance command previously executed by card management section 102.

Hereinafter, card management section 102 likewise executes APDU issuance commands 165-3 to 165-m making up simultaneous command 160 copied into the APDU buffer by card issuance section 104. That is, the APDU issuance command is repeatedly executed until the "number of preceding commands" managed by card issuance section 104 matches APDU number 161 (S1500-3 to S1500-m).

When an error such as a memory shortage occurs in midflow of the processing on the APDU issuance command, card issuance section 104 outputs a status word (e.g.: 6A84h) indicating an unsuccessful end to card management section 102 and stops the processing on the APDU issuance command at that time.

In step S1600, card management section 102 sends a response indicating whether or not executions of all APDU issuance commands have been successfully completed, that is, whether or not the card issuance has been successful to response reception section 156 of external device 150. More specifically, card management section 102 sends a status word indicating a successful end (e.g.: 9000h) when the card issuance has been successful and status word indicating an unsuccessful end (e.g.: 6A84h) when the card issuance has failed to response reception section 156 of external device 150.

Self-issuance management section 158 of external device 150 analyzes the response indicating whether or not the card issuance from card management section 102 received by response reception section 156 has been successful and determines the next operation of external device 150.

If, for example, the response indicate that the card issuance has been successful, self-issuance management section 158 issues an instruction that the processing by external device 150 should be ended and external device 150 ends the processing. Furthermore, when the download application program cannot be used until secure device 100 is reported again that the response indicating the success of the card issuance has been confirmed, self-issuance management section 158 requests command generation section 152 to issue a "card usage authorization confirmation command." In this case, external device 150 ends the processing after the "card usage authorization confirmation command" generated by command generation section 152 is reported to secure device 100 through command sending section 154.

On the other hand, if the response indicate that the card issuance has failed, self-issuance management section 158 outputs an instruction for regenerating and resending self-issuance start command 180 to command generation section 152 and restarts the processing from step S1300 in FIG. 7. Furthermore, when self-issuance management section 158 receives a response that the card issuance has failed even if card issuance processing has been attempted for predetermined times, self-issuance management section 158 may output an instruction for stopping the card issuance to command generation section 152 and external device 150 may end the processing. At this time, the number of card issuance processings to be attempted is arbitrary.

As described above, the communication carried out between external device 150 and secure device 100 for card issuance is only writing of simultaneous command 160 by direct access and sending/reception of self-issuance start command 180 which is a card issuance request. That is, the card issuance processing after receiving self-issuance start command 180 is completed with the internal processing on secure device 100 by repeating processing on the APDU issuance command between card management section 102 and card issuance section 104 as shown in the above step S1500-1 to step S1500-m.

Figure 10:
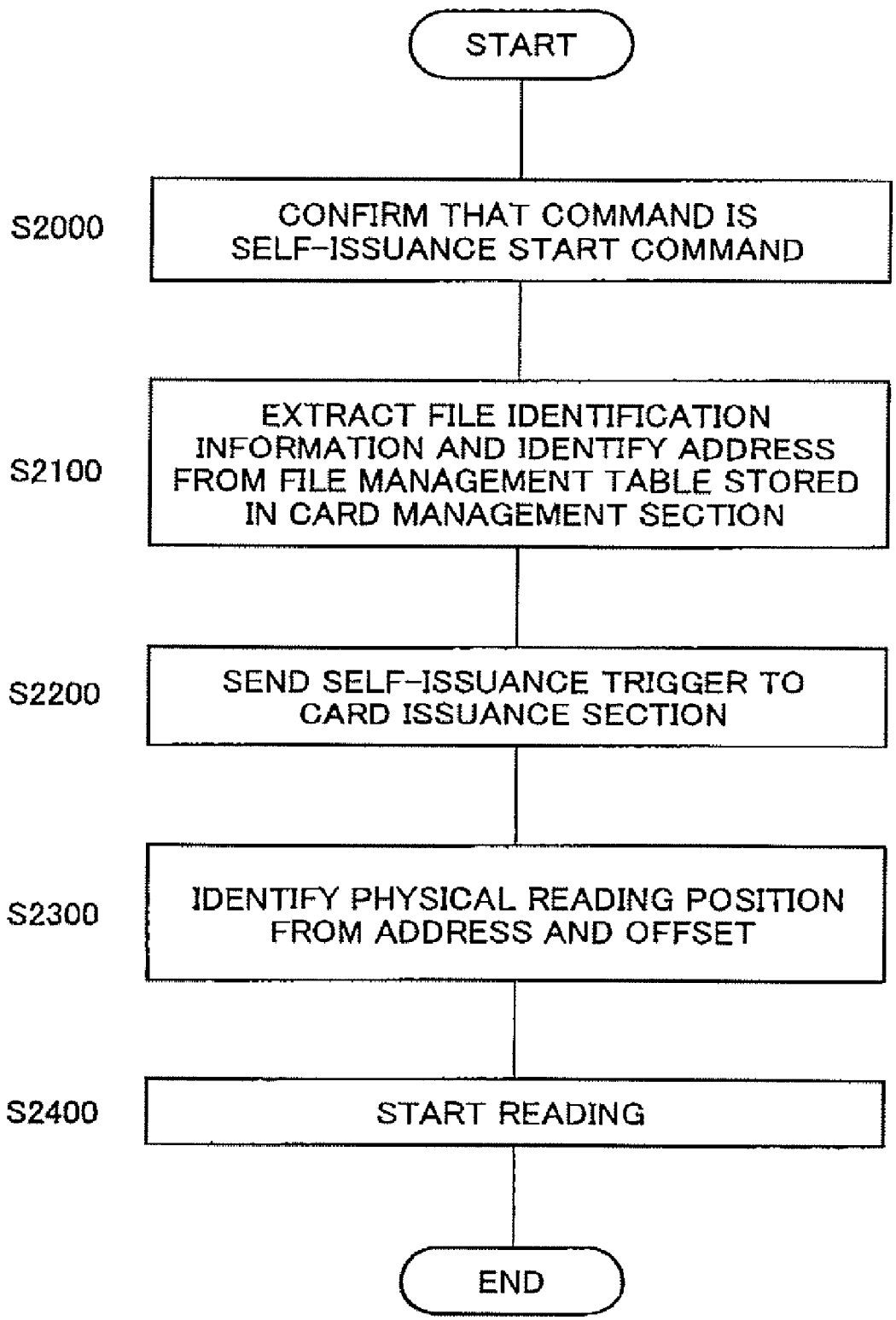
FIG. 10 is a flow chart showing the internal operation of the secure device after a self-issuance start command is received until a read out of an APDU issuance command for card issuance is started.

Here, the operation inside secure device 100 after self-issuance start command 180 is received until a read out of an APDU issuance command for card issuance is started will be explained using a flow chart in FIG. 10.

First, in step S2000, card management section 102 analyzes header section 181 of the received command and confirms that self-issuance start command 180 has been received.

In step S2100, card management section 102 identifies the address corresponding to file identification information 182 with reference to file management table 190 (which will be described later) stored in card management section 102. That is, card management section 102 identifies the file stored in the secure area inside command storage section 106.

FIG. 11 illustrates an example of the file management table. File management table 190 describes, for example, a file name, file path, file identification information, file size, accessibility flag which indicates whether direct access is possible or not and address, and the respective contents are added when a file is created.

Next, in step S2200, card management section 102 outputs a self-issuance trigger to card issuance section 104. The self-issuance trigger includes the address of simultaneous command 160, offset 183 and length 184.

Next, in step S2300, card issuance section 104 identifies the physical reading out position of the first APDU issuance command from the address of simultaneous command 160 and offset 183 included in the self-issuance trigger.

In step S2400, each APDU issuance command making up simultaneous command 160 is read out and executed between card management section 102 and card issuance section 104, that is, self-issuance is started. Here, the length of readable simultaneous command 160 must be smaller than readout length 184 included in self-issuance start command 180.

In this way, inside secure device 100, reading out of the APDU issuance command is started after card management section 102 receives the self-issuance command from external device 150.

This embodiment has explained the case where card issuance is performed by executing an APDU issuance command making up simultaneous command 160 written by direct access from external device 150, but the present invention is not limited to this. For example, when the APDU issuance command corresponding to the function of a card to be acquired is stored in command storage section 106 beforehand, it is possible to complete card issuance inside secure device 100 without carrying out any communication between external device 150 and secure device 100.

In this way, according to this embodiment, downloading of an application and card issuance processing are completed inside the secure device, and therefore it is possible to reduce the number of times communications between the external device and secure device are carried out, reduce influences by interruption of communication and improve safety of card issuance.

That is, conventionally, the number of communications between the external device and secure device in card issuance includes several to several ten times in proportion to the size of an application during downloading of the application, but in this embodiment, the number of communications can be reduced to one time of direct access and one time of self-issuance command. As a result, the exchange of a card issuance command which would be conventionally performed between the external device and card management section can be performed inside the secure device according to this embodiment, and can thereby drastically reduce the risk of communication interruption often occurred in case of a mobile network.

Furthermore, during downloading of an application according to a conventional technology, a session key is shared between the external device and secure device at the time of authentication, then the external device performs encrypting and MAC assignment to the APDU issuance command and the secure device performs decrypting and MAC verification on the APDU issuance command from the external device.

In contrast, in this embodiment, both sides are mutually authenticated through external authentication and internal authentication, then a simultaneous command is stored in an area only accessible to the card management section by direct access and download processing is completed inside the secure device having tampering resistance using this simultaneous command inside the secure device without exposing data to the outside. Therefore, this embodiment need not take eavesdropping or tampering into consideration at the time of card issuance, and therefore encryption and MAC assignment are not necessary. As a result, the card management section only needs to process plain text, and the speed of download processing therefore increases.

Furthermore, since an overall length of a transmittable APDU issuance command is fixed, the size of data transmittable with one APDU issuance command in the case of plain text is larger compared to when encryption or MAC assignment is performed. Therefore, when plain text processing is applicable, the total number of commands issued is also small and speed enhancement of download processing is also effective in this respect, too.

Furthermore, according to this embodiment, it is possible to freely change, add or delete command groups stored in the command storage section and a simultaneous command written into the secure area of the command storage section, and thereby implement a secure device having an application requested by the user.

Furthermore, according to this embodiment, when the provider who provides card issuance data is different from the operater who operates card issuance, card issuance is completed without the operate's knowing what commands are set in advance by the provider, and therefore it is possible to realize security protection at the time of card issuance.

Embodiment 2

Figure 12:
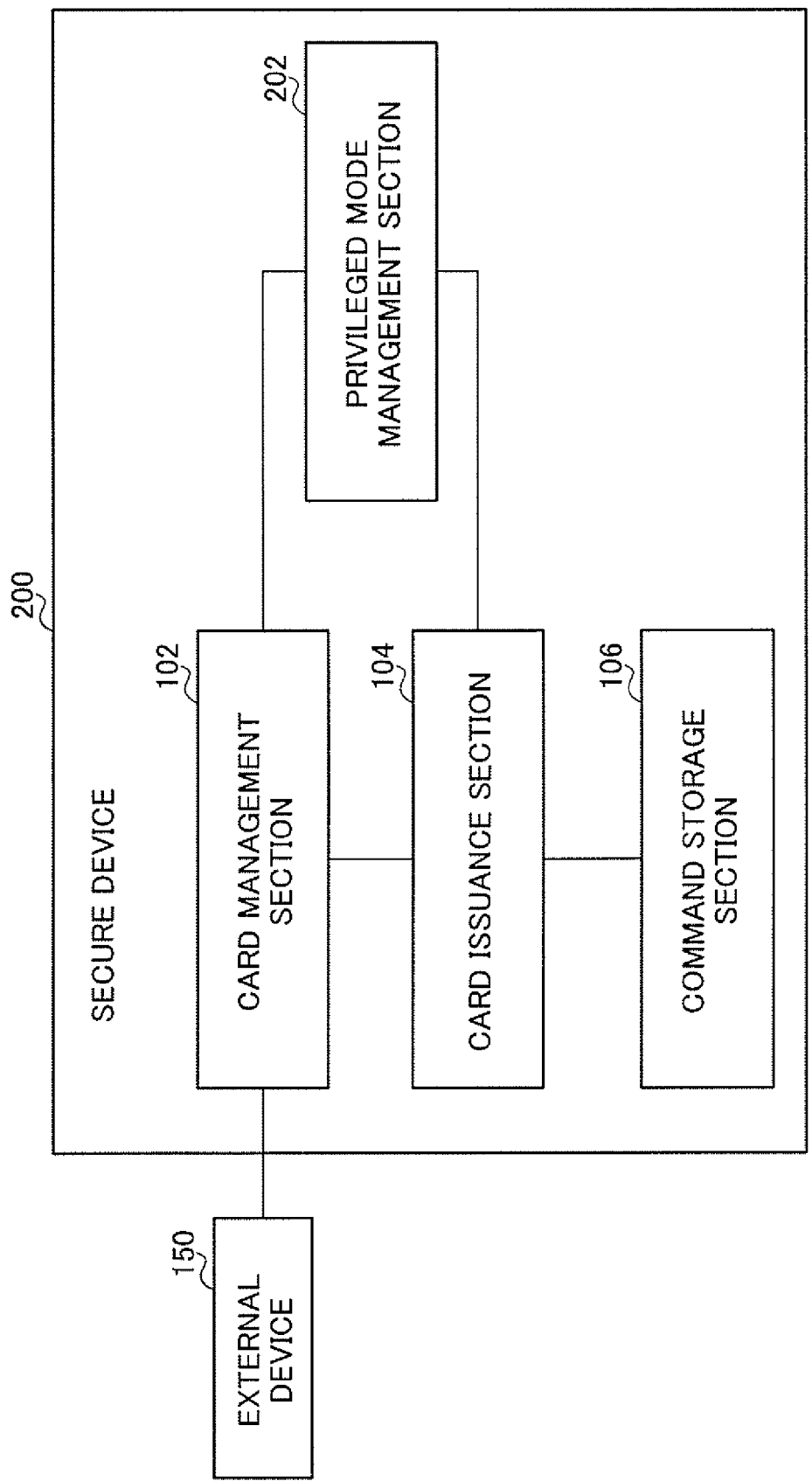
FIG. 12 is a block diagram showing the configuration of a secure device according to Embodiment 2 of the present invention.

FIG. 12 is a block diagram showing the configuration of a secure device according to Embodiment 2 of the present invention. The same components as those in the secure device according to Embodiment 1 are assigned the same reference numerals and explanations thereof will be omitted.

In FIG. 12, secure device 200 adopts a configuration corresponding to secure device 100 in FIG. 5 further provided with privileged mode management section 202.

Privileged mode management section 202 operates in coordination with card management section 102 and card issuance section 104 and sets a mode called a "privileged mode" in secure device 200.

The "privileged mode" is a mode in which top priority is given to card issuance processing inside secure device 200, that is, processing of an APDU issuance command making up simultaneous command 160 between card management section 102 and card issuance section 104 (self-issuance). As long as a privileged mode is set, data cannot be exchanged with external device 150 through a contact interface or non-contact interface of secure device 200 (e.g., sending/reception of self-issuance start command and response). Timing at which privileged mode management section 202 sets a privileged mode will be explained in detail in the later explanation of the operation.

The operation of secure device 200 configured as described above will be explained in detail using FIG. 13.

Figure 13:
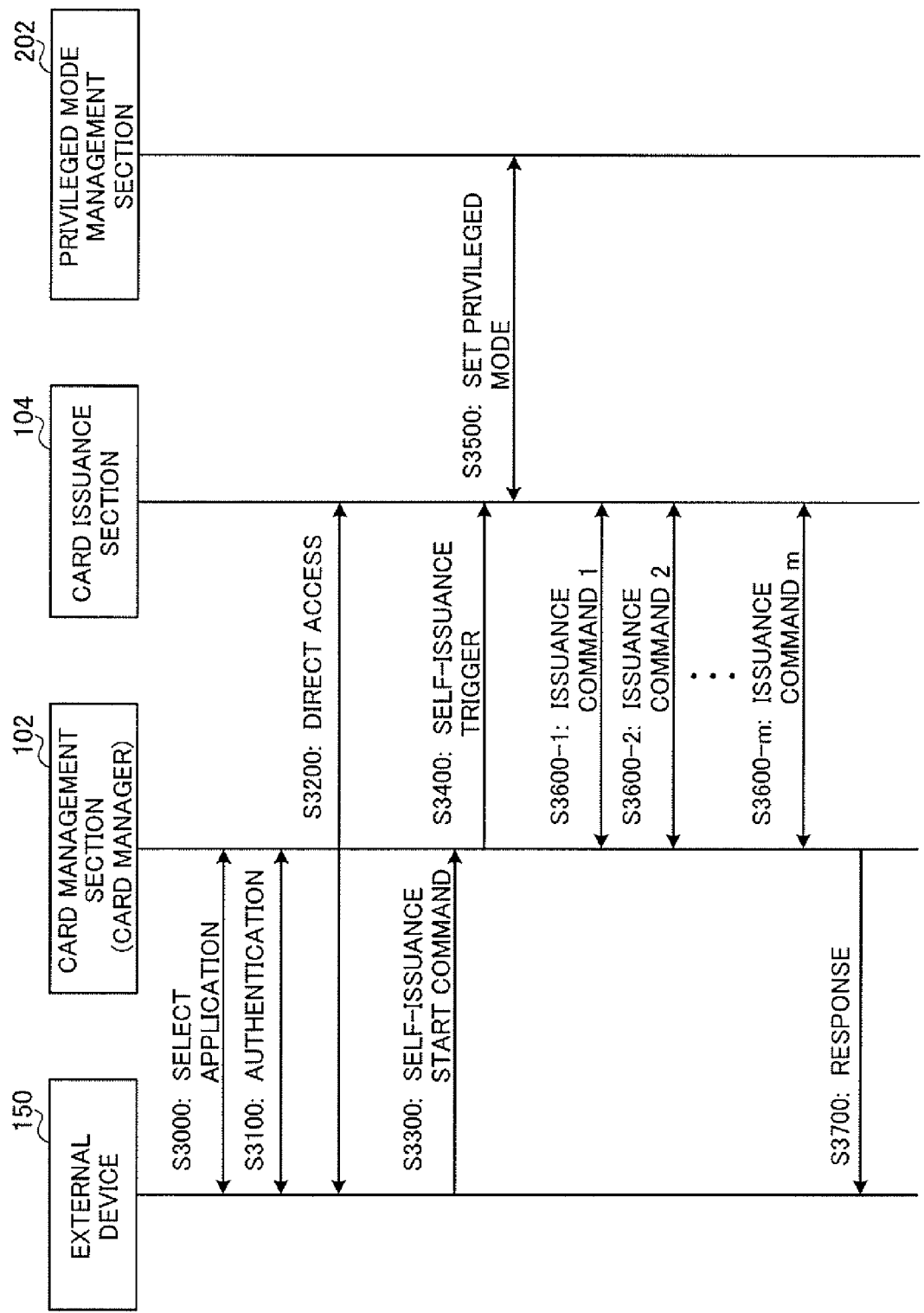
FIG. 13 is a sequence diagram showing processing by the external device, card management section, card issuance section and privileged mode management section according to Embodiment 2 of the present invention.

FIG. 13 is a sequence diagram showing processing by external device 150, card management section 102, card issuance section 104 and privileged mode management section 202 according to Embodiment 2 of the present invention.

Processes in step S3000 to step S3400 in FIG. 13 and process in step S3700 are the same as the processes in step S1000 to step S1400 in FIG. 7 and process in step S1600, and therefore explanations thereof will be omitted.

In step S3500, after card issuance section 104 receives a self-issuance trigger from card management section 102, privileged mode management section 202 sets a privileged mode in secure device 200. More specifically, card issuance section 104 that has inputted a self-issuance trigger from card management section 102 instructs privileged mode management section 202 to set a privileged mode or instructs privileged mode management section 202 to set a privileged mode at the same time as card management section 102 outputs the self-issuance trigger to card issuance section 104. Then, privileged mode management section 202 receives an instruction from card management section 102 or card issuance section 104 and sets the privileged mode in secure device 200.

Note that the privileged mode need not always be set after card issuance section 104 receives the self-issuance trigger. For example, the privileged mode may also be set after a lapse of a predetermined period after card management section 102 receives a self-issuance start command from external device 150 or card issuance section 104 receives a self-issuance trigger.

In step S3600-1 to step S3600-m as in the case of step S1500-1 to step S1500-m in FIG. 7, self-issuance is performed between card management section 102 and card issuance section 104. At this time, a privileged mode is set in secure device 200, and therefore data cannot be exchanged between secure device 200 and external device 150 even through the contact interface and non-contact interface in secure device 200.

After the privileged mode is set once and secure device 200 has transitioned to a privileged mode, the privileged mode is canceled by power supply halting to secure device 200, selection of another application or re-selection of currently selected card management section 102.

In this way, this embodiment sets a privileged mode in the secure device, prevents data from being exchanged between the secure device and external device for a period which the privileged mode is set, and can thereby safely and reliably perform card issuance processing inside the secure device without any interference.

Embodiment 3

Figure 14:
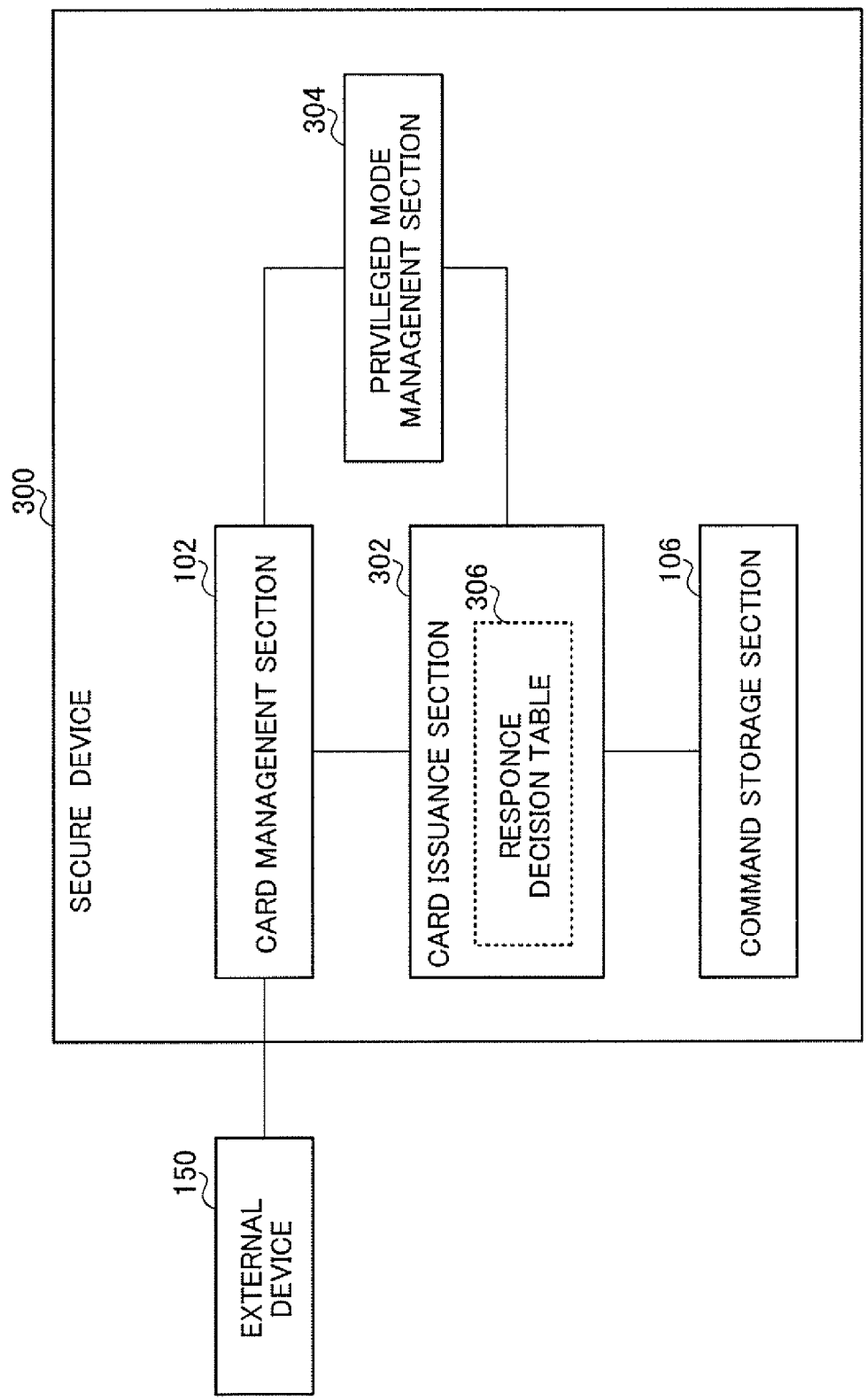
FIG. 14 is a block diagram showing the configuration of a secure device according to Embodiment 3 of the present invention.

FIG. 14 is a block diagram showing the configuration of a secure device according to Embodiment 3 of the present invention. The same components as those in the secure device according to Embodiment 2 are assigned the same reference numerals and explanations thereof will be omitted.

Comparing with secure device 200 in FIG. 12, in FIG. 14, secure device 300 adopts a configuration having card issuance section 302 and privileged mode management section 304 instead of card issuance section 102 and privileged mode management section 202.

Card issuance section 302 is provided with response decision table 306 to decide whether or not a status word from card management section 102 after processing of each APDU issuance command during card self-issuance means successful.

Card issuance section 302 has the following function in addition to the function of card issuance section 102. That is, card issuance section 302 refers to response decision table 306 to decide whether or not each APDU issuance command has been executed successfully by card management section 102 during self-issuance, that is, whether or not self-issuance has been successfully performed. When the decision result shows that self-issuance has been successfully completed or that some APDU issuance commands have not been executed successfully during self-issuance, card issuance section 302 outputs the decision result to privileged mode management section 304.

In addition to the function of privileged mode management section 202, after a privileged mode is set in secure device 300, privileged mode management section 304 has a function of canceling the set privileged mode when any one of a decision result that self-issuance has been successfully completed or a decision result that self-issuance has not been executed successfully is input from card issuance section 302.

The operation of secure device 300 configured as shown above will be explained in detail using FIG. 15.

Figure 15:
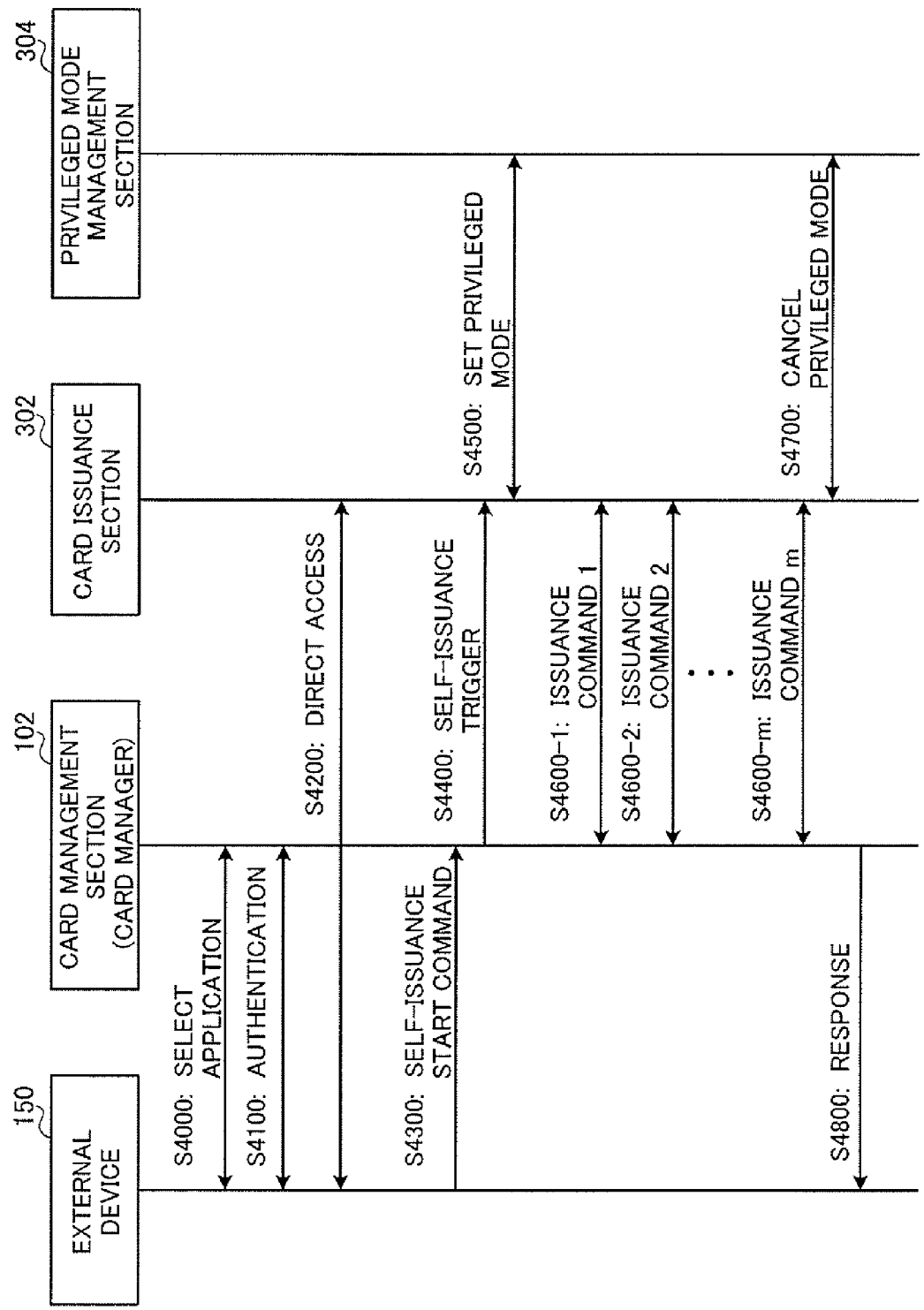
FIG. 15 is a sequence diagram showing processing by the external device, card management section, card issuance section and privileged mode management section according to Embodiment 3 of the present invention.

FIG. 15 is a sequence diagram showing processing by external device 150, card management section 102, card issuance section 302 and privileged mode management section 304 according to Embodiment 3 of the present invention.

Processes in step S4000 to step S4500 in FIG. 15 are the same as the processes in step S3000 to step S3500 in FIG. 13, and therefore explanations thereof will be omitted.

In step S4600-1 to step S4600-m, self-issuance is performed between card management section 102 and card issuance section 302. At this time, since a privileged mode is set in secure device 300, data cannot be exchanged between secure device 300 and external device 150 even through the contact interface and non-contact interface of secure device 300.

First, upon inputting a self-issuance trigger from card management section 102, card issuance section 302 extracts first APDU issuance command 165-1 (e.g.: Install For Load) specified by command length 170-1 of simultaneous command 160 shown in FIG. 8 and copies first APDU issuance command 165-1 to an APDU buffer in card management section 102.

Card management section 102 executes APDU issuance command 165-1 (Install For Load) copied into the APDU buffer. Card management section 102 reports a status word indicating a successful end as its response when the execution is successfully completed, and reports a status word indicating an unsuccessful end as its response when the execution is not successfully completed to card issuance section 302 (S4600-1).

Here, the method of reporting a response from card management section 102 to card issuance section 302 will be explained using FIGS. 16(A), (B). FIG. 16(A) illustrates an example where card management section 102 reports a response to card issuance section 302. FIG. 16(B) illustrates another example where card management section 102 reports a response to card issuance section 302.

In the example of FIG. 16(A), a response is reported by copying response data stored in the response buffer of card management section 102 into the response buffer of card issuance section 302. On the other hand, in the example in FIG. 16(B), a response is reported by card issuance section 302 which referes to response data stored in the response buffer of card management section 102.

With reference to response decision table 306, card issuance section 302 decides whether or not APDU issuance command 165-1 (Install For Load) has been processed successfully by comparing the status word which is a response from card management section 102 with response decision table 306.

When the decision result shows that APDU issuance command 165-1 has been processed successfully, card issuance section 302 moves to the next processing on APDU issuance command 165-2 (Load1). Furthermore, when the decision shows that APDU issuance command 165-1 has not been processed successfully, card issuance section 302 sends its decision result to privileged mode management section 304 and requests a cancellation of the privileged mode.

Upon receiving the decision result that APDU issuance command 165-1 has not been processed successfully and the privileged mode cancellation request from card issuance section 302, privileged mode management section 304 cancels the privileged mode set in secure device 300. After the cancellation of the privileged mode, communication with external device 150 becomes possible and card management section 102 sends a status word meaning that card issuance has failed (e.g.: 6A84h) to response reception section 156 of external device 150.

Figures 16, 17:
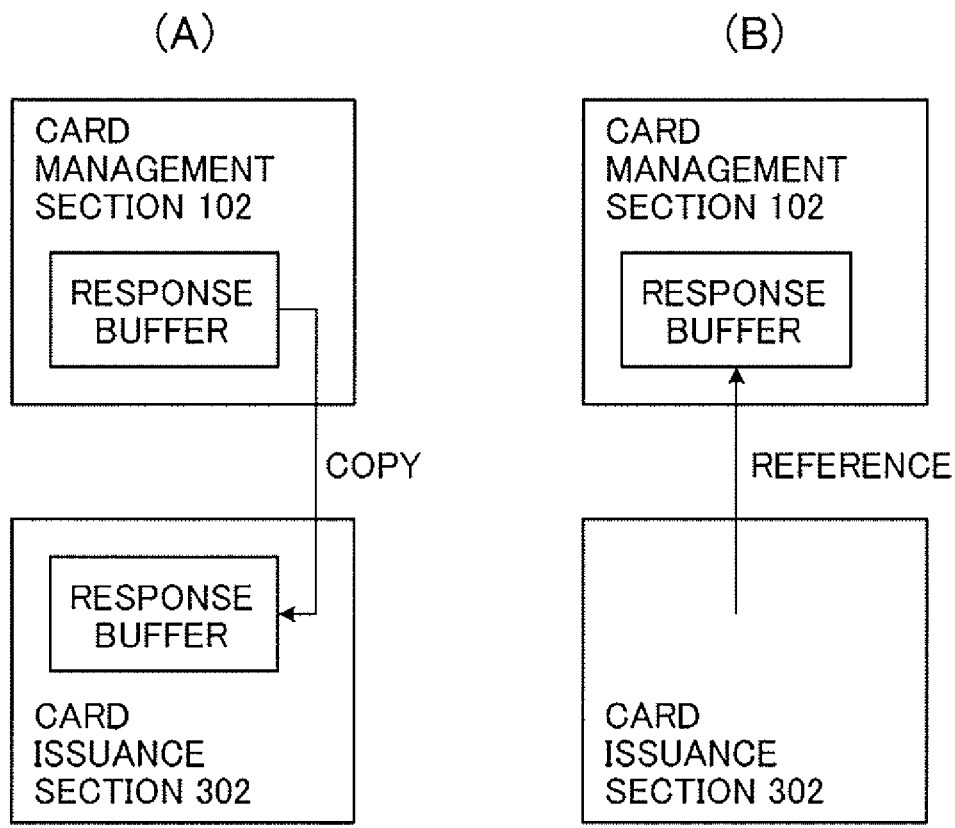
FIG. 17 illustrates an example of a response decision table.

Here, response decision table 306 will be explained using FIG. 17. FIG. 17 illustrates an example of response decision table 306.

In the example of FIG. 17, response decision table 306 shows that the status word of the reported response being "9000h" means that the APDU issuance command has been processed successfully (success) and the status word of the reported response being "other than 9000h" means that the APDU issuance command has not been processed successfully (failure).

Hereinafter, self-issuance is likewise performed by sequentially processing respective APDU issuance commands 165-2 to 165-m making up simultaneous command 160 between card management section 102 and card issuance section 302.

When some APDU issuance command is not processed successfully during self-issuance, the privileged mode is canceled. In this case, card management section 102 sends a status word meaning that card issuance has failed to response reception section 156 of external device 150 (S4800).

On the other hand, even when all APDU issuance commands 165-1 to 165-m have been processed successfully and self-issuance has been successful, the privileged mode is also canceled. In this case, card management section 102 sends a status word meaning that card issuance has been successful to response reception section 156 of external device 150 (S4800).

Next, the operation of card issuance section 302 according to this embodiment after self-issuance starts will be explained using FIG. 18.

Figure 18:
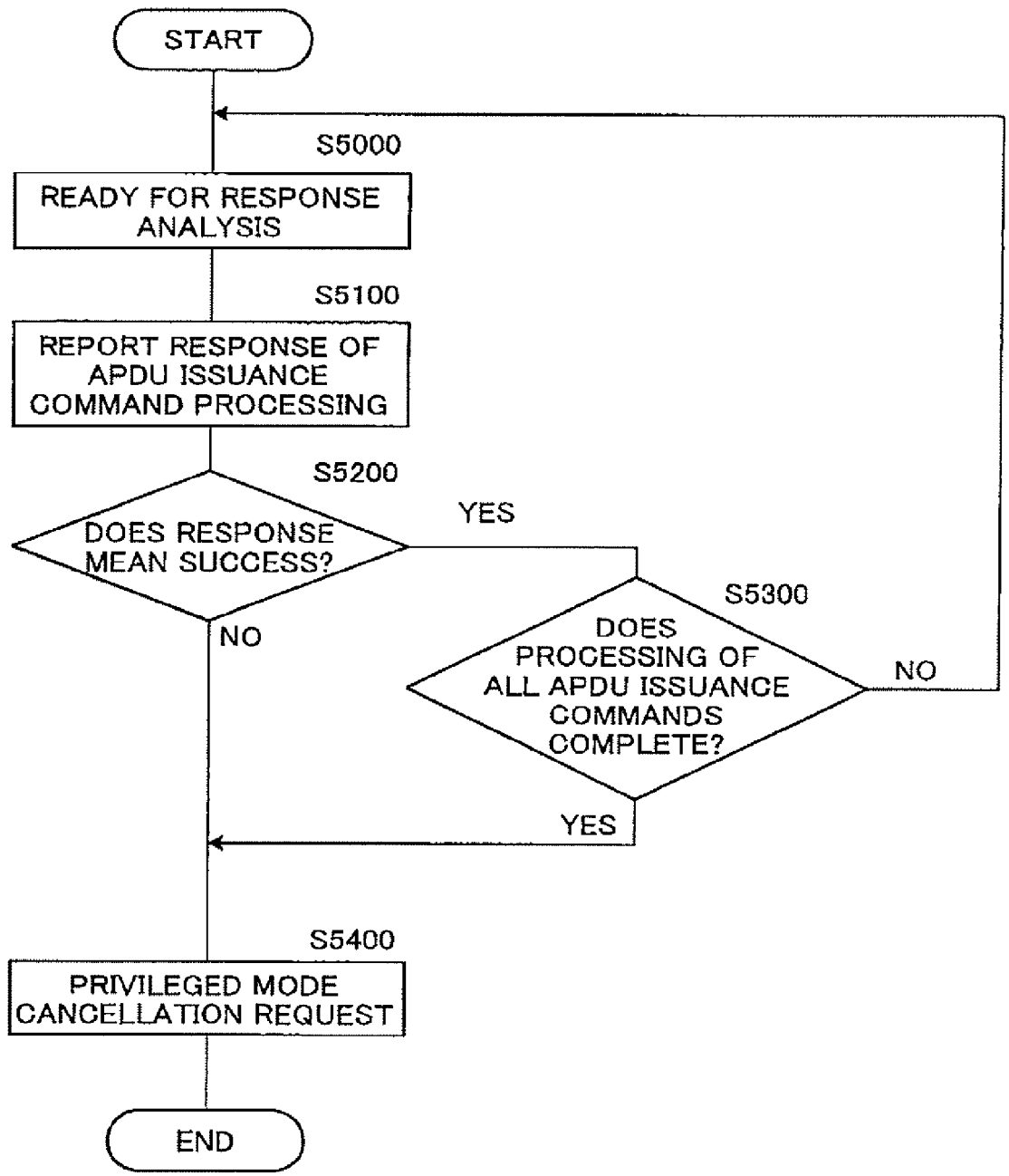
FIG. 18 is a flow chart showing the operation during self-issuance of the card issuance section according to Embodiment 3 of the present invention.

FIG. 18 is a flow chart showing the operation of card issuance section 302 according to Embodiment 3 of the present invention during self-issuance. This embodiment will be explained assuming that a privileged mode is set in secure device 300.

First, in step S5000, card issuance section 302 is ready for a response analysis and is waiting for a response indicating the processing result of the APDU issuance command from card management section 102.

In step S5100, card issuance section 302 receives a report of the response indicating the processing result of the APDU issuance command from card management section 102.

In step S5200, with reference to response decision table 306, card issuance section 302 decides whether or not the response reported in step S5100 means that the APDU issuance command processing has been successful As a result of the decision, when the response means success (S5200: YES), card issuance section 302 moves to step S5300 and when the response does not mean success (S5200: NO), card issuance section 302 moves to step S5400.

In step S5300, card issuance section 302 decides whether or not processing on all APDU issuance commands has been completed. When the decision result shows that the processing on all APDU issuance commands has been completed (S5300: YES), card issuance section 302 moves to step S5400 and when the decision result shows that the processing on all APDU issuance commands has not been completed (S5300: NO), card issuance section 302 moves back to step S5000 and waits for a response indicating the processing result of the next APDU issuance command.

In step S5400, card issuance section 302 sends the information that some APDU issuance commands have not been processed successfully or the processing on all APDU issuance commands has been completed to privileged mode management section 304 and requests a cancellation of the privileged mode which has been set.

Thus, according to this embodiment, the privileged mode is canceled at timing at which all APDU issuance commands are processed and self-issuance is performed successfully or at timing at which some APDU issuance command is not processed successfully and self-issuance fails, and therefore it is possible to speedily report the self-issuance processing result to the external device.

Embodiment 4

Figure 19:
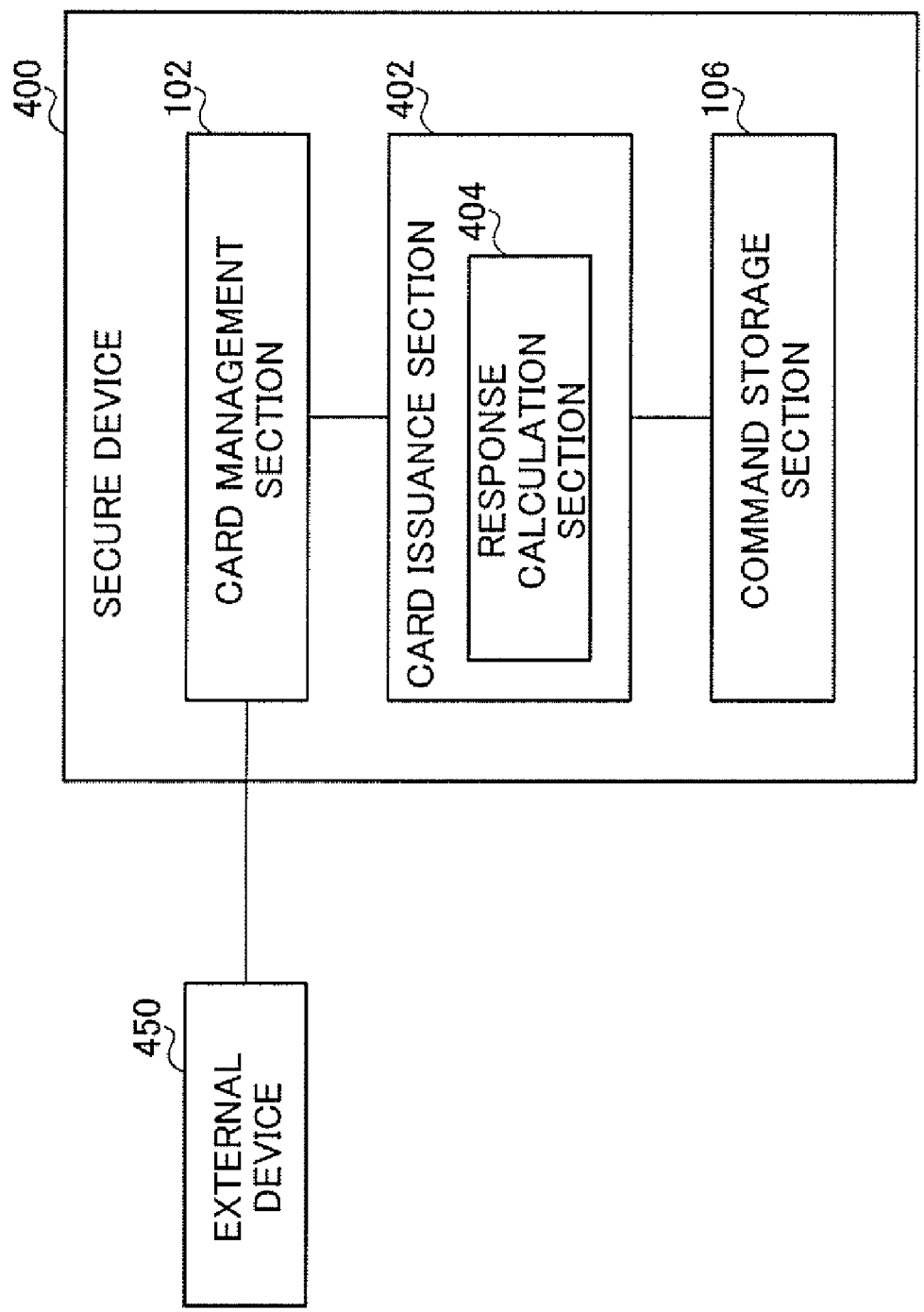
FIG. 19 is a block diagram showing the configuration of a secure device according to Embodiment 4 of the present invention.

FIG. 19 is a block diagram showing the configuration of a secure device according to Embodiment 4 of the present invention. The same components as those of the secure device according to Embodiment 1 are assigned the same reference numerals and explanations thereof will be omitted.

Comparing with secure device 100 in FIG. 5, in FIG. 19, secure device 400 adopts a configuration having card issuance section 402 instead of card issuance section 104.

Card issuance section 402 is provided with response calculation section 404 that calculates, when a failure of card issuance is detected during self-issuance, a response including information that card issuance has failed and information indicating "to what extent self-issuance has been successful."

Card issuance section 402 has the following function in addition to the function of card issuance section 104 That is, card issuance section 402 monitors a progress status of processing of each APDU issuance command during self-issuance and sends, when some APDU issuance command is not executed successfully and self-issuance fails, a status word meaning that card issuance has failed due to an unsuccessful end and information indicating "to what extent self-issuance has been successful" to card management section 102.

The information indicating "to what extent self-issuance has been successful" includes various types of information such as the number of successfully processed APDU issuance commands, header sections of the APDU issuance commands whose processing has failed and the number of remaining APDU issuance commands. That is, the information indicating "to what extent self-issuance has been successful" is the information from which information that identifies successfully executed card issuance commands can be obtained.

This embodiment will explain a case where the number of successfully processed APDU issuance commands is used as an example of information indicating "to what extent self-issuance has been successful" and the information that identifies card issuance commands that have been executed successfully is obtained from this information.

That is, response calculation section 404 according to this embodiment calculates, when self-issuance fails, a response including information indicating "to what extent self-issuance has been successful" using the number of APDU issuance commands that have been processed successfully by then.

Figure 20:
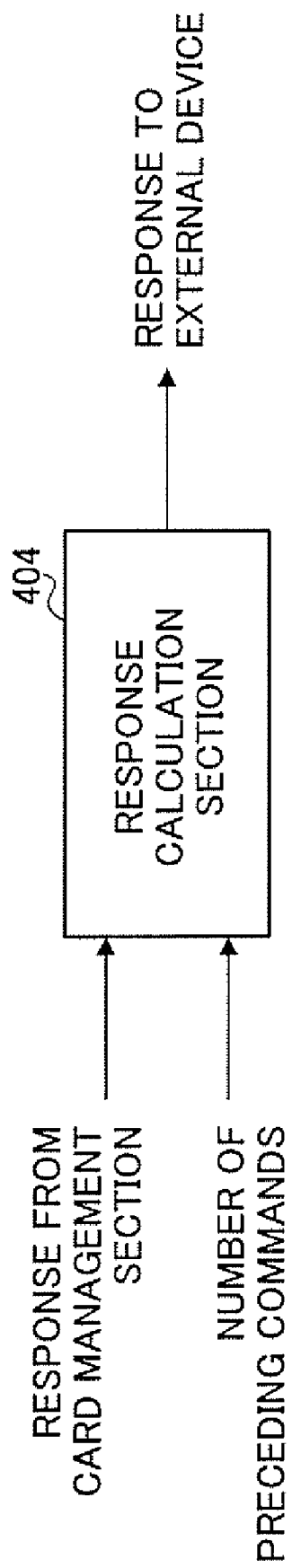
FIG. 20 illustrates input/output of the response calculation section.

Calculations of response by response calculation section 404 will be explained using FIG. 20. FIG. 20 illustrates input/output of response calculation section 404.

In FIG. 20, upon receiving a response that an APDU issuance command has been executed successfully from card management section 102, response calculation section 404 increments the "number of preceding commands" managed by card issuance section 402 by 1 and moves to processing on the next APDU issuance command. Furthermore, since the "number of preceding commands" at the start of self-issuance is zero, the "number of preceding commands", when an APDU issuance command is not executed successfully and self-issuance fails, is the value indicating the number of APDU issuance commands processed successfully by that time point. Therefore, it is possible to include information indicating that self-issuance has failed and also the number of APDU issuance commands processed successfully by the time point at which self-issuance fails, that is, information indicating "to what extent self-issuance has been successful" in the response to external device 150.

Figure 21:
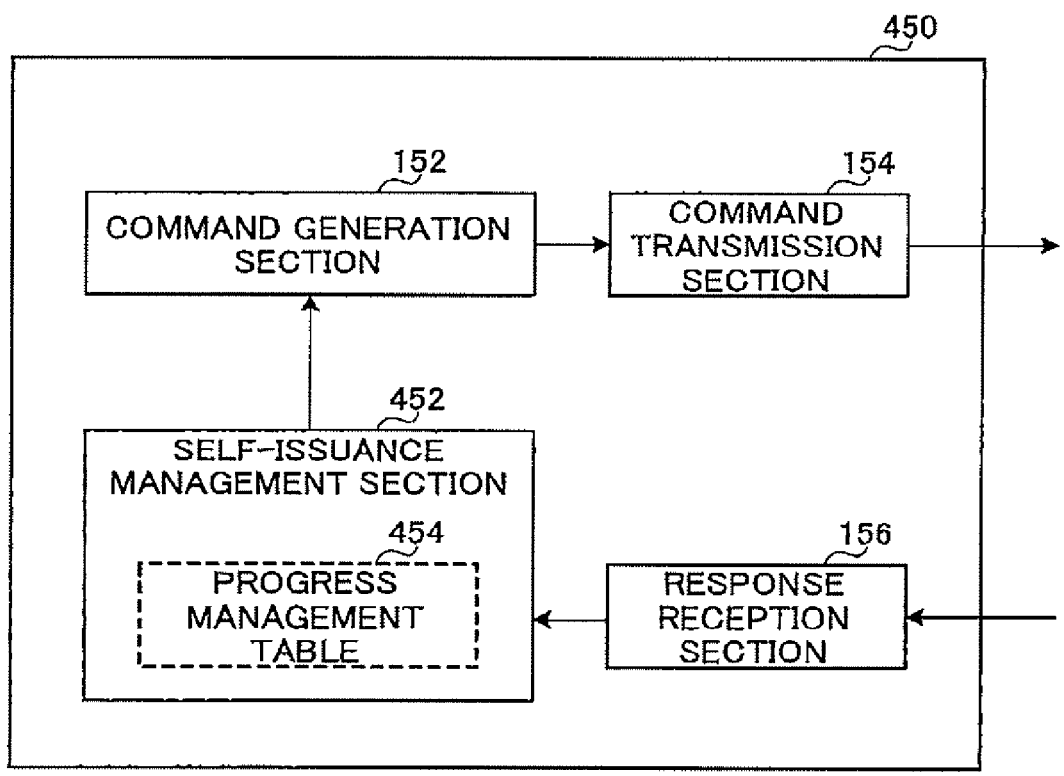
FIG. 21 is a block diagram showing the configuration of the external device in FIG. 19.

Next, the configuration of external device 450 in FIG. 19 will be explained using FIG. 21. FIG. 21 is a block diagram showing the configuration of external device 450 in FIG. 19.

Comparing with external device 150 in FIG. 6, in FIG. 21, external device 450 is provided with self-issuance management section 452 instead of self-issuance management section 158.

Self-issuance management section 452 is provided with progress management table 454 which stores each APDU issuance command processed during self-issuance in correspondence with contents of processing on each APDU issuance command.

In addition to the function of self-issuance management section 158, upon receiving a response that self-issuance has failed, self-issuance management section 452 has a function of identifying APDU issuance commands which have not been executed successfully and issuing an instruction for starting processing on the APDU issuance command.

Figure 22:
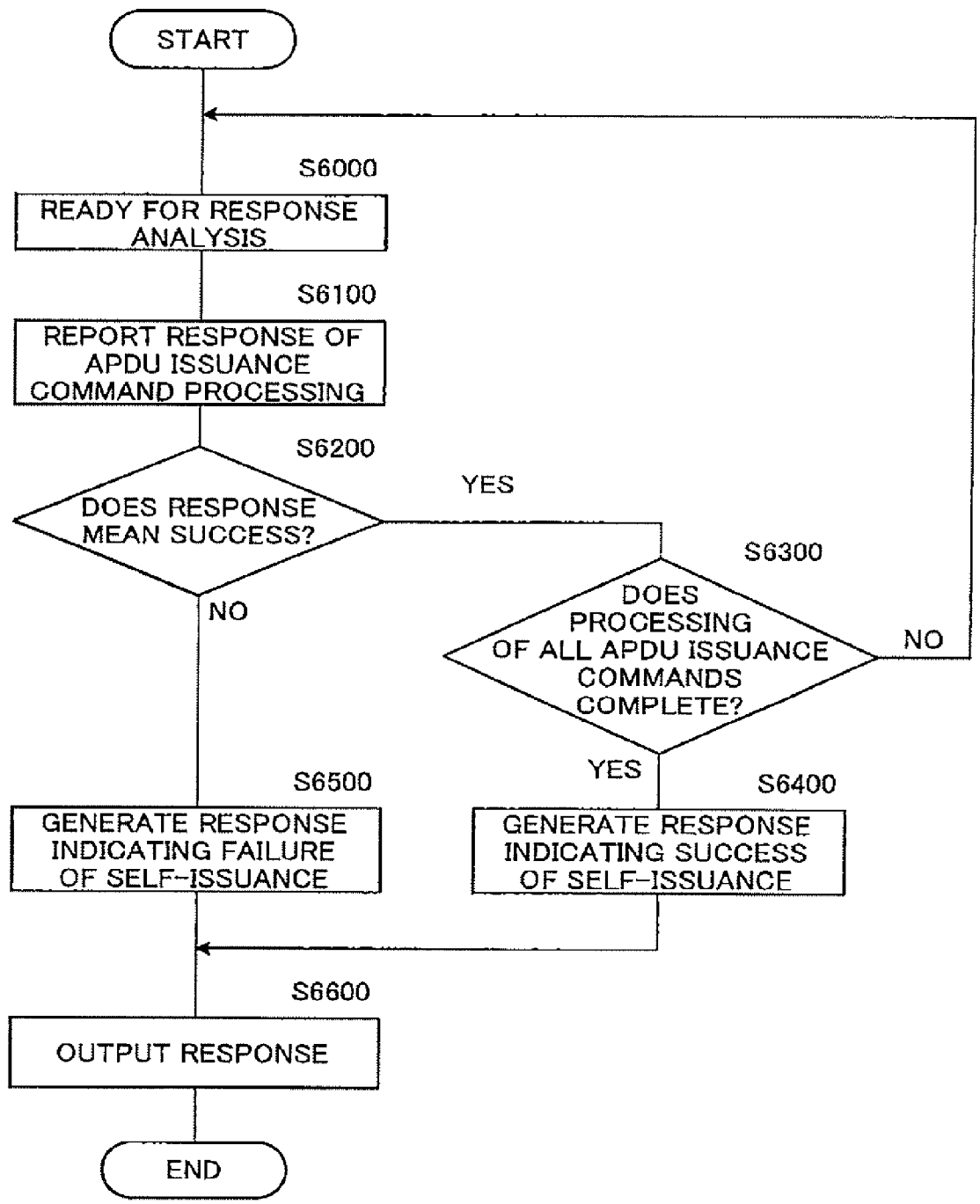
FIG. 22 is a flow chart showing the operation during self-issuance of the card issuance section according to Embodiment 4 of the present invention.

Hereinafter, the operation of card issuance section 402 according to this embodiment after starting self-issuance will be explained using a flow chart in FIG. 22.

First, in step S6000, card issuance section 402 is ready for a response analysis and is waiting for a response indicating the result of APDU issuance command processing from card management section 102.

In step S6100, card issuance section 402 receives a response report indicating the result of the APDU issuance command processing from card management section 102.

In step S6200, card issuance section 402 decides whether or not the response reported in step S6100 means success of the APDU issuance command processing. Card issuance section 402 moves to step S6300 when the decision result shows that the response means success (S6200: YES) and moves to step S6500 when the response does not mean success (S6200: NO).

In step S6300, card issuance section 402 decides whether or not processing on all APDU issuance commands has been completed. When the decision result shows that the processing on all APDU issuance commands has been completed (S6300: YES), card issuance section 402 moves to step S6400 and when the decision result shows that the processing on all APDU issuance commands has not been completed (S6300: NO), card issuance section 402 moves back to step S6000 and waits for a response indicating the processing result of the next APDU issuance command.

In step S6400, card issuance section 402 generates a response indicating that the processing on all APDU issuance commands has been completed and self-issuance has been successful.

On the other hand, in step S6500, card issuance section 402 generates a response indicating that some APDU issuance commands have not been processed successfully and self-issuance has failed. This response includes the number of preceding commands by the time self-issuance fails, that is, the number of APDU issuance commands processed successfully by the time self-issuance fails.

Figure 23:
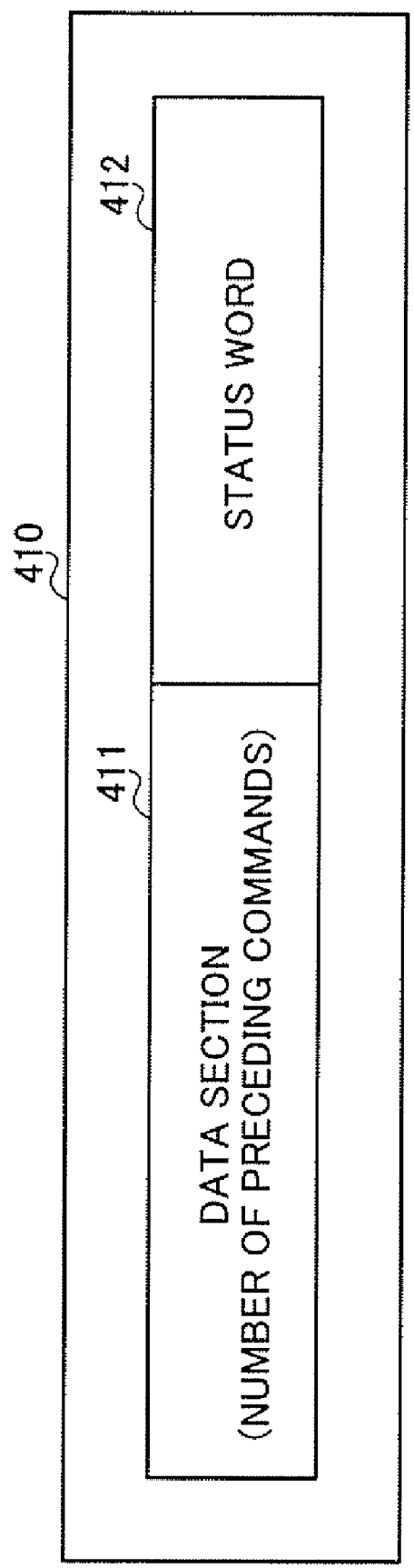
FIG. 23 illustrates an example of the format of a response indicating that self-issuance has failed.

Here, a response generated in step S6500 will be explained using FIG. 23. FIG. 23 illustrates an example of the format of a response indicating that self-issuance has failed.

In FIG. 23, response 410 is made up of the number of preceding commands 411 indicating the progress status of self-issuance processing and status word 412 indicating that self-issuance processing has failed.

As the response format, for example, one using any bit of a 2-byte status word (e.g.: 63CXh (X: number of preceding commands)) may also be used in addition to the format shown in FIG. 23.

In step S6600, card issuance section 402 outputs the response generated in step S6400 or step S6500 to card management section 102. This response is sent from card management section 102 to response reception section 156 of external device 450.

Figure 24:
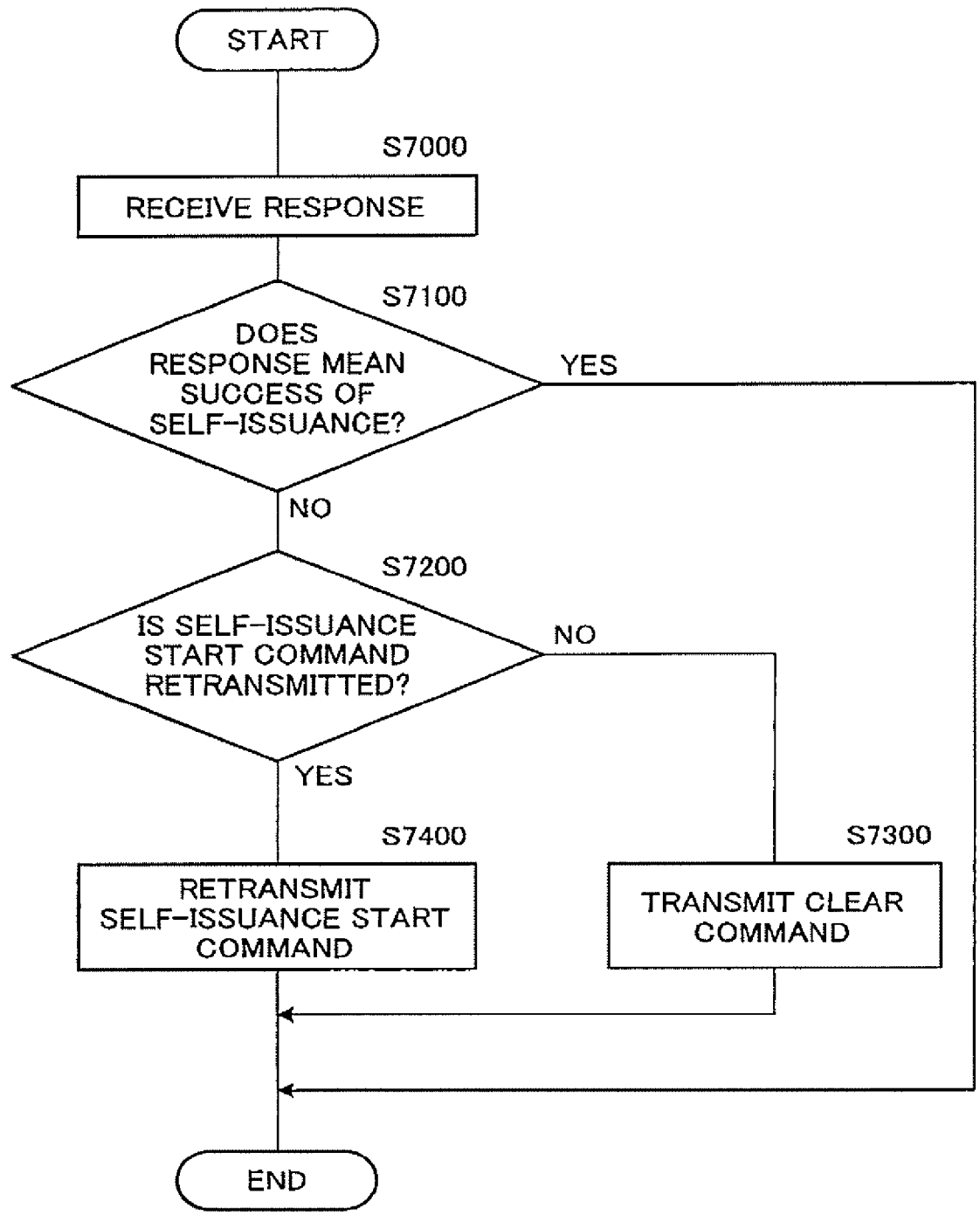
FIG. 24 is a flow chart showing the operation of the external device after receiving a response from the secure device according to Embodiment 4 of the present invention.

Next, the operation of external device 450 after receiving a response indicating whether or not self-issuance from secure device 400 has been successful will be explained using a flow chart in FIG. 24.

First, in step S7000, response reception section 156 receives a response indicating whether or not self-issuance from card management section 102 has been successful. The received response is output to self-issuance management section 452.

In step S7100, self-issuance management section 452 decides whether or not the response received in step S7000 means that self-issuance has been successful. More specifically, this decision is made by self-issuance management section 452 which referes to the status word included in the response.

When the result of the decision made by self-issuance management section 452 shows that the response means that self-issuance has been successful (S7100: YES), the processing by external device 450 ends. At this time, if the downloaded application program cannot be used until the receipt of the response meaning that self-issuance has been successful is reported to secure device 400 again, external device 450 generates a "card usage authorization confirmation command", sends the command to secure device 400 and ends the processing. On the other hand, when self-issuance management section 452 decides that the response does not mean success of self-issuance (S7100: NO), self-issuance management section 452 moves to step S7200.

In step S7200, self-issuance management section 452 decides whether or not to resend a self-issuance start command. As a result of the decision, the self-issuance management section 452 moves to step S7300 when it is decided not to resend the self-issuance start command (S7200: NO), and moves to step S7400 when it is decided to resend the self-issuance start command (S7200: YES).

When secure device 400 cannot make any recovery for some reasons (e.g. , the memory in secure device 400 is corrupted), self-issuance management section 452 performs nothing in step S7200.

In step S7300, with reference to progress management table 454, self-issuance management section 452 generates a "clear command" to clear data written during self-issuance (successfully processed APDU issuance command), sends the clear command to secure device 400 and ends the processing.

Here, progress management table 454 will be explained using FIG. 25. FIG. 25 illustrates an example of progress management table 454.

Progress management table 454 describes the "number of preceding commands" included in the response from secure device 400 and processing contents of external device 450 corresponding to the "number of preceding commands" for each "number of preceding commands."

FIG. 25 shows that an nth APDU issuance command has not been processed successfully through self-issuance in secure device 400. Here, n is an integer that satisfies $1 \leq n \leq m$ (m: number of APDU issuance commands). In this case, in step S7300, a clear command to clear commands up to the nth successfully processed APDU issuance command (all data written during issuance) is sent.

Furthermore, in step S7400, self-issuance management section 452 identifies APDU issuance commands which have not been processed successfully with reference to progress management table 454, resends a self-issuance start command for starting processing on the APDU issuance commands and ends the processing.

In the example of FIG. 25, since the nth APDU issuance command has not been processed successfully, a self-issuance start command for starting processing from the nth APDU issuance command is resent.

When secure device 400 cannot start processing from the APDU issuance command which has not been processed successfully for reasons related to the mounting or the like even when the above described self-issuance command is received, a self-issuance start command for starting card issuance from the beginning is resent.

Thus, according to this embodiment, even when self-issuance fails, a progress status of self-issuance indicating to what extent self-issuance has been successful is reported to the external device, and therefore the external device can resend a self-issuance start command for starting processing from the APDU issuance command which has not been processed successfully and thereby omit redundant, useless self-issuance processing.

Embodiment 5

The foregoing embodiments (Embodiments 1 to 4) have explained the method whereby the card issuance section which has received a self-issuance start command identifies a file for storing a simultaneous command, extracts an APDU issuance command included in the file, copies the APDU issuance command to the APDU buffer in card management section 102 and the card management section thereby executes the APDU issuance command without distinguishing whether the APDU issuance command has been sent from the external device through a contact interface or non-contact interface or is derived from self-issuance.

This embodiment will explain a mode in which an APDU buffer when a contact interface or non-contact interface is used and an APDU buffer at the time self-issuance are not shared.

Figure 26:
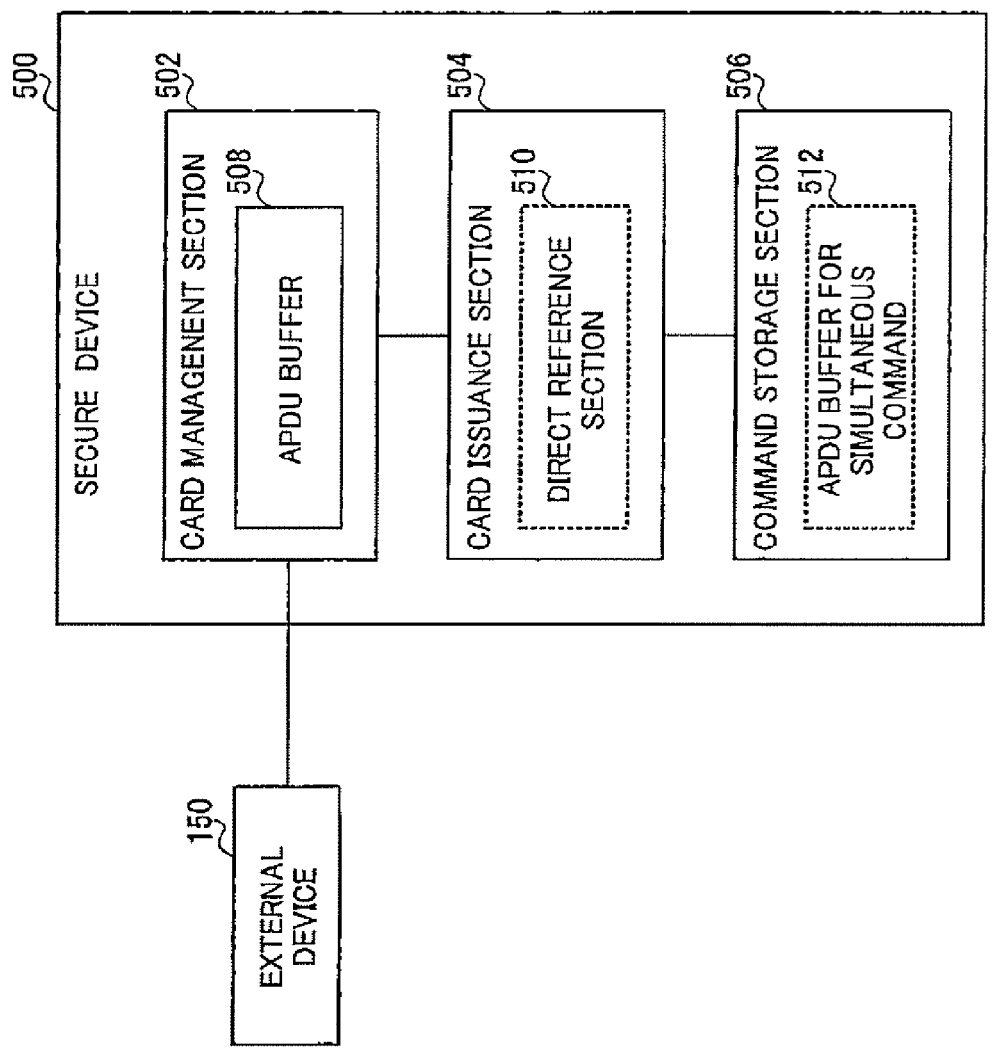
FIG. 26 is a block diagram showing the configuration of a secure device according to Embodiment 5 of the present invention.

FIG. 26 is a block diagram showing the configuration of a secure device according to Embodiment 5 of the present invention. The same components as those in the secure device according to Embodiment 1 are assigned the same reference numerals and explanations thereof will be omitted.

Comparing with the secure device in FIG. 5, in FIG. 26, secure device 500 adopts a configuration having card management section 502, card issuance section 504 and command storage section 506 instead of card management section 102, card issuance section 104 and command storage section 106.

Card management section 502 is provided with APDU buffer 508 that stores APDU issuance commands for executing card issuance written from external device 150 using a contact interface and non-contact interface.

Card issuance section 504 is provided with direct reference section 510. The card management section 502 can directly refer to an area specified by APDU buffer for simultaneous command 512 by way of the direct reference section 510. APDU buffer for simultaneous command 512 will be described later.

Command storage section 506 is provided with APDU buffer for simultaneous command 512 that specifies part of the area of the stored simultaneous command as an APDU buffer for the simultaneous command.

Figure 27:
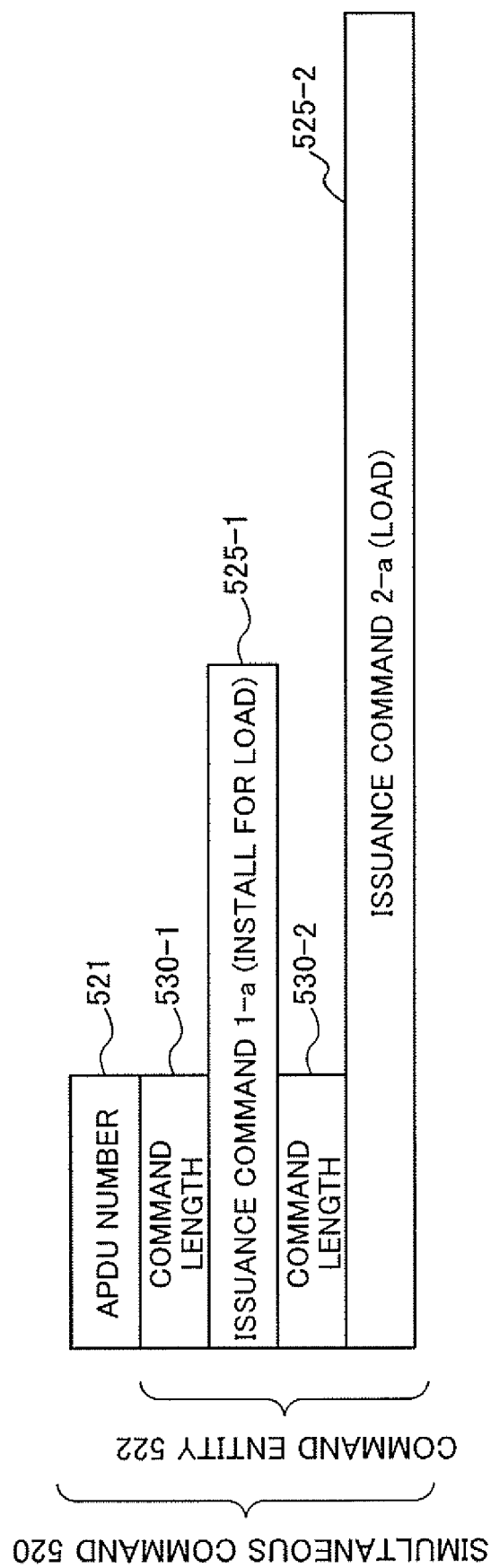
FIG. 27 illustrates an example of the configuration of a simultaneous command according to Embodiment 5 of the present invention.

First, simultaneous command 520 in this embodiment will be explained using FIG. 27. FIG. 27 illustrates an example of the configuration of simultaneous command 520 according to Embodiment 5 of the present invention. FIG. 27 is an example of the configuration of a simultaneous command when a first APDU issuance command (Install For Load) is processed.

In FIG. 27, simultaneous command 520 is constructed of APDU number 521 and command entity 522. APDU number 521 indicates the number of APDU issuance commands. In the example of FIG. 27, APDU number 521 is 2.

Command entity 522 is constructed of data made up of APDU issuance commands (1-*a*) 525-1, (2-*a*) 525-2 and command lengths 530-1, 530-2 indicating of how many bytes each APDU issuance command is composed. Their respective roles will be described later.

Hereinafter, the operation of secure device 500 configured as shown above will be explained.

First, external device 150 writes an APDU issuance command for executing card issuance into APDU buffer 508 of card management section 502.

Next, upon receiving a self-issuance start command from external device 150, card management section 502 outputs a self-issuance trigger to card issuance section 504. This self-issuance trigger is a trigger to start self-issuance for card issuance section 504.

When the self-issuance trigger from card management section 502 is inputted, card issuance section 504 extracts first APDU issuance command (e.g.: Install For Load) 525-1 from simultaneous command 520 by the length, for example, specified by command length 530-1 in FIG. 27 and specifies an area corresponding to the length of this APDU issuance command as an APDU buffer in command storage section 506.

At this time, APDU buffer 508 storing APDU issuance commands from external device 150 and APDU buffer for simultaneous command 512 coexist in secure device 500. That is, the APDU buffer storing APDU issuance commands from external device 150 belongs to card management section 502 and APDU buffer for simultaneous command 512 belongs to command storage section 506.

In the example of FIG. 27, when first APDU issuance command (1-a) 525-1 is processed, the area occupied by APDU issuance command (1-a) 525-1 (specified area) itself becomes APDU buffer for simultaneous command 512.

While APDU buffer 508 that stores APDU issuance commands from external device 150 is permanent as a fixed area, APDU buffer for simultaneous command 512 occupies the area in which APDU issuance commands are stored (specified area) only the moment a certain APDU issuance command is processed, and the address and size of the area vary momentarily every time the next APDU issuance command is processed. That is, after first APDU issuance command (1-a) 525-1 is processed, the area occupied by next APDU issuance command (2-a) 525-2 itself becomes APDU buffer for simultaneous command 512.

Here, FIG. 8 that illustrates simultaneous command 160 in Embodiment 1 will be compared with FIG. 27 that illustrates simultaneous command 520 in this embodiment.

In FIG. 8, a LOAD command is divided into issuance command 2 to issuance command m. For example, when data to be downloaded is 2000 kbytes, if the maximum length of data that can be sent at a time, that is, data that can be stored in APDU buffer 508 is assumed to be 255 bytes (this applies to plain text. And the maximum length of data (plain text) becomes shorter in the case of encryption or MAC assignment), since 255×7<2000<255×8 and the data needs to be sent divided into 8 commands, the number of issuance commands m becomes m=9.

On the other hand, in FIG. 27, a Load command is specified by APDU buffer for simultaneous command 512 and the command can thereby be completed through only one-time processing. That is, out of the simultaneous command, APDU buffer for simultaneous command 512 is always only an APDU issuance command which is about to be processed (specified area) and direct reference section 510 refers to the area specified by this APDU buffer for simultaneous command 512 and processes the area, and then only the next APDU issuance command to be processed (specified area) becomes APDU buffer for simultaneous command 512.

The function of managing downloading of card management section 502 (card manager) acquires data from APDU buffer for simultaneous command 512 through direct reference section 510. This scheme is just the same as card manager acquires data from APDU buffer 508 of card management section 502. In any case, the behavior of the card manager opereates equivalent processing in terms of accessing the APDU buffer.

Next, the operation of the card manager will be explained in a comparison between the case where Load commands are received over a plurality of times as in the case of Embodiment 1 and the case where Load commands are received at one time as in this embodiment.

Processing Load commands over a plurality of times requires the number of APDU issuance commands, processing of receiving APDU issuance commands, processing of acquiring data from the APDU buffer, command check to determine whether or not the commands are sent in correct order or whether or not the command is the last one, data processing, retention of an intermediate state to process the next APDU issuance command and response sending processing.

On the other hand, processing Load commands at one time provides an advantage that most of the above described series of processing becomes unnecessary.

Examples of timing of using direct reference section 510 include timing of requesting from card management section 502 to direct reference section 510 after receiving a self-issuance start command and timing of requesting direct reference section 510 after card issuance section 504 receives a self-issuance trigger.

As in the case of Embodiment 2 or Embodiment 3, it is possible to allow a privileged mode to be set in the secure device and use direct reference section 510 only for a period during which the privileged mode is set.

Thus, according to this embodiment, through the direct reference section, it is possible to drastically reduce routines compared with a case where APDU issuance commands are divided and processed, and omit redundant preparation to process the next APDU issuance command. Therefore, it is possible to drastically enhance the speed compared with a conventional technique of downloading APDU issuance commands from the external device over a plurality of times.

When an application is downloaded to the secure device using a highly portable mobile terminal such as a cellular phone having a read/write function, the speed enhancement of card issuance is significant because the battery capacity which serves as a power supply is generally limited.

Furthermore, in the case where the secure device is a removal medium which can be inserted/removed into/from a cellular phone, the user may suddenly switch off power or pull out the secure device while download is in progress. This causes a power supply halting to the secure device. The capability of high-speed processing in such cases also means that the possibility of being influenced by a user's wrong operation is reduced, which is therefore of great significance.

Embodiment 6

Figure 28:
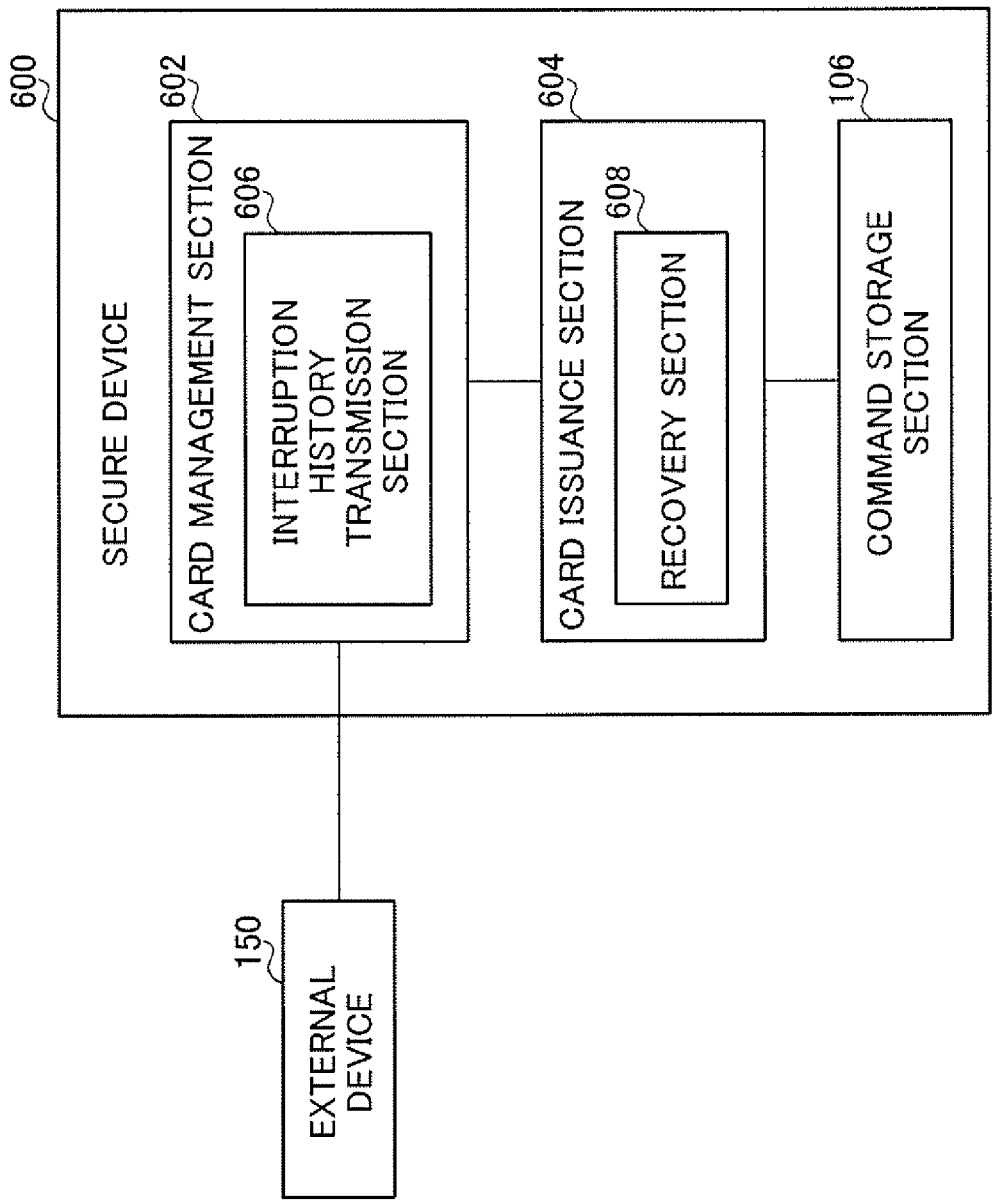
FIG. 28 is a block diagram showing the configuration of a secure device according to Embodiment 6 of the present invention.

FIG. 28 is a block diagram showing the configuration of a secure device according to Embodiment 6 of the present invention. The same components as those in the secure device according to Embodiment 1 are assigned the same reference numerals and explanations thereof will be omitted.

When power supply to the card is cut in mid-flow of self-issuance, the secure device stops card issuance and it is not possible to send a response to the external device. Therefore, the external device cannot know the progress status of card issuance at the secure device. According to this embodiment, power supply is cut in even such a case, it is possible to identify an APDU issuance command whose card issuance is stopped or an APDU issuance command close to this, and restart card issuance from the identified APDU issuance command.

Comparing with the configuration of the secure device in FIG. 5, in FIG. 28, secure device 600 adopts a configuration having card management section 602 and card issuance section 604 instead of card management section 102 and card issuance section 104.

Card management section 602 is provided with interruption history sending section 606 that stores a history of self-issuance interruptions for reasons of power interruption or the like by monitoring the number of preceding commands indicating the number of APDU issuance commands processed during self-issuance.

In addition to the function of card management section 102, card management section 602 has a function of storing a history of self-issuance interruptions for reasons such as power interruption and outputting the history to recovery section 608 of card issuance section 604. As shown above, the history of self-issuance interruptions is stored by monitoring the number of preceding commands, and therefore it is possible to identify a first APDU issuance command that failed to send a processing result to external device 150 due to an interruption from the history of self-issuance interruptions.

Card issuance section 604 is provided with recovery section 608 that identifies an APDU issuance command to be restarted in self-issuance from the history of self-issuance interruptions input from interruption history sending section 606.

In addition to the function of card issuance section 104, card issuance section 604 has a function of identifying an APDU issuance command whose self-issuance should be restarted when self-issuance is interrupted for reasons of power interruption or the like and self-issuance is then restarted and restarting the processing from the APDU issuance command.

The operation of secure device 600 configured as described above will be explained using a flow chart in FIG. 29.

Figure 29:
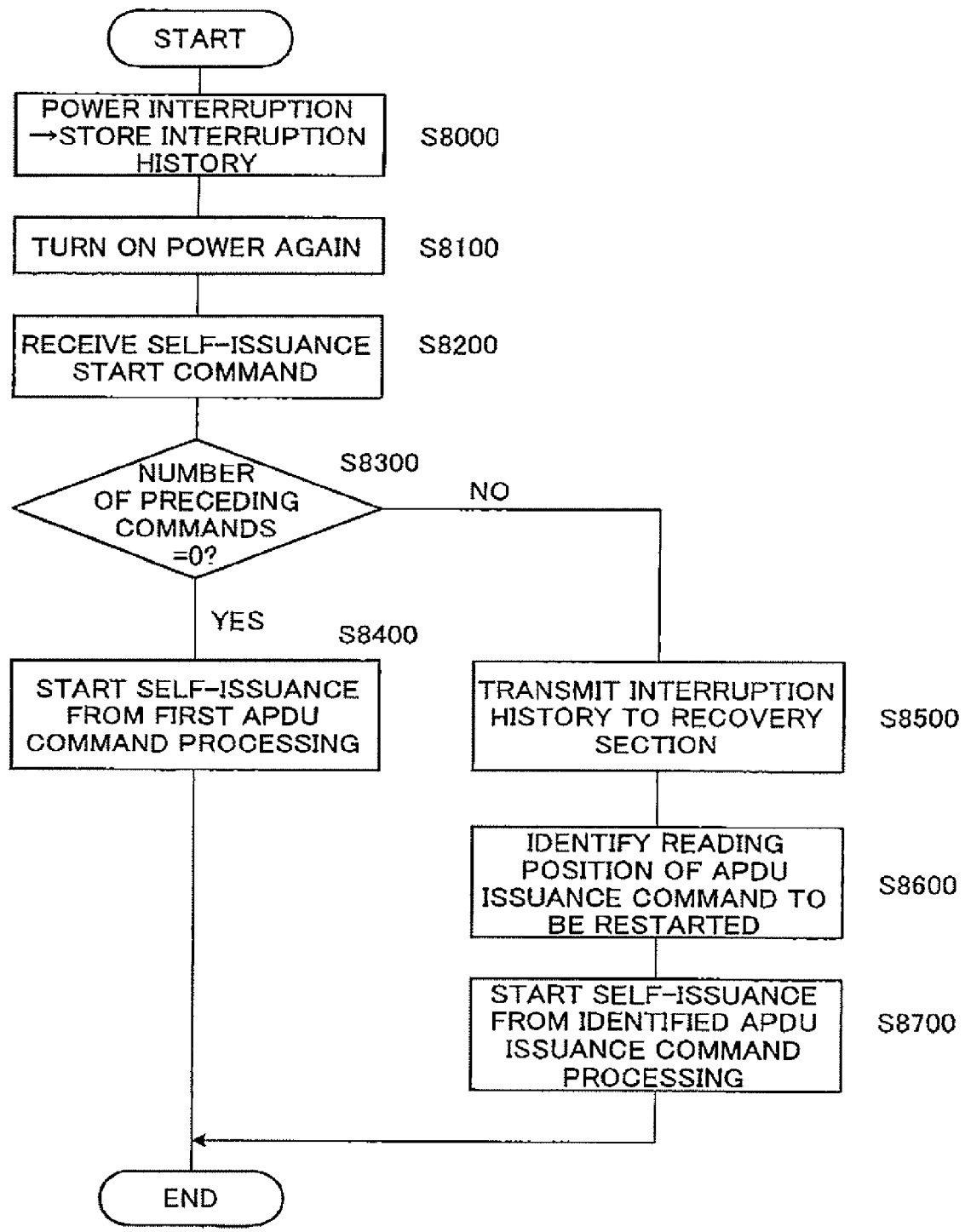
FIG. 29 is a flow chart showing the operation of the secure device according to Embodiment 6 of the present invention.

FIG. 29 is a flow chart showing the operation of the secure device according to Embodiment 6 of the present invention. In the example in FIG. 29, suppose the power to secure device 600 is cut during self-issuance, self-issuance is interrupted and then power to the secure device 600 is turned on again.

First, in step S8000, the power to secure device 600 is cut during self-issuance. When a power interruption is detected, card management section 602 stores the history of self-issuance interruptions. The history of self-issuance interruptions includes information capable of identifying the first APDU issuance command that failed to send the processing result to external device 150 due to the interruption out of the responses indicating the processing results of the APDU issuance commands. Power interruption is detected using, for example, session time out.

In step S8100, the interrupted power to secure device 600 is turned on again.

In step S8200, card management section 602 receives a self-issuance start command from external device 150.

In step S8300, card management section 602 decides whether or not the number of preceding commands managed by card management section 602 is zero. When the decision result shows that the number of preceding commands is zero (S8300: YES), card management section 602 moves to step S8400 and when the decision result shows that the number of preceding commands is not zero (S8300: NO), it moves to step S8500. As shown above, the number of preceding commands indicates the number of APDU issuance commands successfully processed. Therefore, that the number of preceding commands is not zero when power is turned on again means that self-issuance of secure device 600 is interrupted when power is interrupted in step S8000.

In step S8400, self-issuance similar to that in Embodiment 1 is started by carrying out processing starting with the first APDU issuance command.

On the other hand, in step S8500, card management section 602 sends the history of self-issuance interruptions stored in interruption history sending section 606 to recovery section 608 of card issuance section 604.

In step S8600, recovery section 608 of card issuance section 604 identifies the reading out position of an APDU issuance command subject to first processing to restart self-issuance.

Here, the identification processing on the APDU issuance command subject to the first processing by recovery section 608 will be explained using FIG. 30 and FIG. 31.

Figure 30:
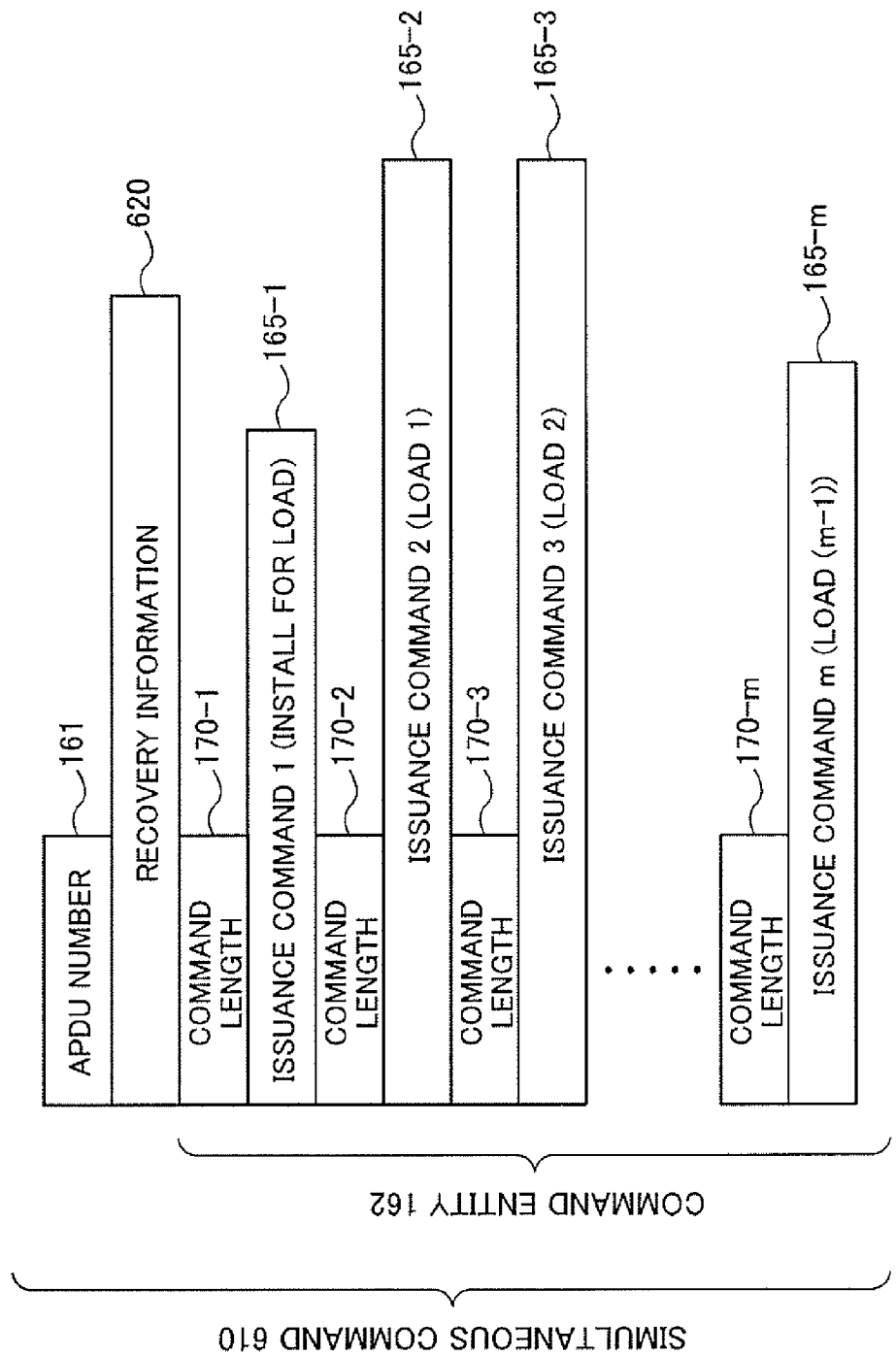
FIG. 30 illustrates an example of the configuration of a simultaneous command according to Embodiment 6 of the present invention.

FIG. 30 illustrates an example of simultaneous command 610 according to Embodiment 6 of the present invention.

Simultaneous command 610 in FIG. 30 corresponds to the configuration of simultaneous command 160 in FIG. 8 further provided with recovery information 620. The rest of the configuration is identical to that of simultaneous command 160 in FIG. 8, and therefore explanations thereof will be omitted.

Figure 31:
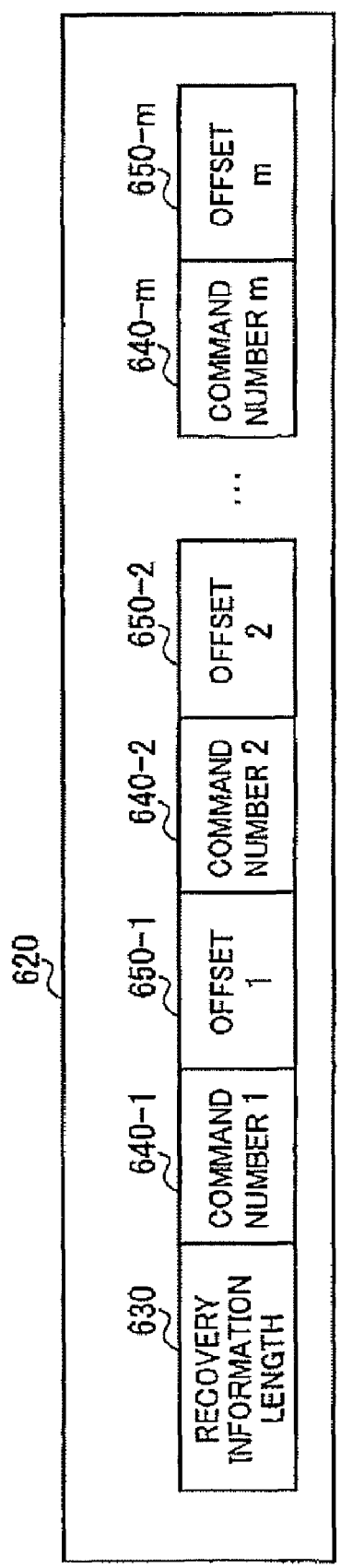
FIG. 31 illustrates an example of the configuration of recovery information included in the simultaneous command in FIG. 30.

FIG. 31 illustrates an example of the configuration of recovery information 620 included in the simultaneous command in FIG. 30.

In FIG. 31, recovery information 620 is made up of recovery information length 630 indicating the length of recovery information 620, command numbers 640-1, 640-2, ... 640-m and offsets 650-1, 650-2, ..., 650-m. Command numbers and offsets are set in a plurality of pairs.

Command numbers 640-1 to 640-m are information indicating an APDU issuance command from which processing is started when self-issuance is restarted. Offsets 650-1 to 650-m are information indicating from which position of simultaneous command 610, APDU issuance commands identified by command numbers 640-1 to 640-m start.

Recovery section 608 can identify the command number of an APDU issuance command to be processed first to restart self-issuance with reference to the history of self-issuance interruptions from card management section 602. Recovery section 608 identifies the physical reading out position of the APDU issuance command to be processed first out of simultaneous command 610 using above described recovery information 620.

Here, it has been assumed that the reading out position of the APDU issuance command is determined with reference to recovery information 620, but it is also possible to identify the reading out position by analyzing simultaneous command 160 with no recovery information 620 as shown in FIG. 8 from the beginning. For example, in FIG. 8, when the number of preceding commands is 2, it is possible to identify the address at which command length 170-1 exists, add the specified length to the address, then identify the address at which command length 170-2 exists and determine the reading out position of APDU issuance command 165-2 that follows.

In step S8700, processing is started from the APDU issuance command identified in step S8600 and self-issuance is started.

A case has been described above where the recovery processing shown in FIG. 29 can be redone from an APDU issuance command with which a power interruption occurred, maintaining the area secured and data stored so far (a case where recovery processing is possible in command units).

In addition to this, the recovery processing may possibly include the following pattern which is dependent on the mounting of the secure device.

First, there can be a case where when power is turned on again or when a self-issuance request is received from an external device after a power interruption occurs, all the data processed in the secure device by the time power interruption occur (secured area and stored data) is cleared.

The recovery processing in this case is to restart card issuance from the beginning. For the secure device to which such mounting is applied, it is possible to store the number of preceding commands to be managed by the card management section in a primary storage area such as RAM. Furthermore, the external device may also send a self-issuance command when card issuance is requested from the user after a power interruption occurs.

Second, there may also be a case where the recovery processing can be redone after the certain APDU issuance command, maintaining data processed in the secure device (secured area and stored data) before processing of a certain APDU issuance command (when recovery processing is possible in function units).

The recovery processing in this case is to store the APDU issuance command successfully processed in function units and restart processing from the next APDU issuance command. Therefore, there may also be a case where it is necessary to process the APDU issuance command successfully processed when self-issuance is interrupted, but it is preferable from the standpoint of processing of card issuance.

A specific example where recovery processing is performed in function units will be shown below.

For example, suppose "1" is set in command number 1 (640-1) and "2" is set in command number (640-2) respectively in FIG. 31.

In FIG. 30, issuance command 3 (Load2) 165-3 is the third APDU issuance command and if a power interruption occurs while this issuance command is being executed, the number of preceding commands managed by card management section 102 is "3" and is stored in a non-volatile storage area such as EEPROM.

In this case, in step S8600 of FIG. 29, recovery section 806 to which the number of preceding commands "3" is input compares the number of preceding commands "3," "1" which is set in command number 1 (640-1) and "2" which is set in command number (640-2), and since these have a relation of 1<2<3, recovery section 608 decides to restart the execution of the issuance command of "2" which is smaller than "3" and closest to "3."

Card issuance section 604 then extracts issuance command 2 (Load1) 165-2 corresponding to command number "2," copies it to the APDU buffer and starts card issuance.

This embodiment has described the case where it is decided whether or not a command issued is zero at timing at which a self-issuance start command is received and self-issuance is restarted, but the present invention is not limited to this. For example, it is also possible to decide whether or not a command issued is zero when an interruption of self-issuance ends (e.g.: when power is turned on again) and restart self-issuance.

Thus, according to this embodiment, even when self-issuance is interrupted for reasons such as a power interruption of the secure device, the secure device stores the history of interruptions, and therefore it is possible to identify the optimal reading out position of an APDU issuance command when self-issuance is restarted.

That is, since the card management section is provided with the interruption history sending section and the card issuance section is provided with the recovery section, it is possible to make a retry in post-processing when power supply to the card is interrupted in mid-flow of self-issuance. Furthermore, the external device can make a retry without being aware of the progress status of self-issuance when power supply to the secure device is restarted so that it is possible to reduce the load of card issuance.

As explained in the above embodiments, with regard to the secure device and external device of the present invention, the external device sends an instruction to the secure device once and then the secure device can execute processing independently, and therefore the present invention is suitable for card issuance in an insufficient condition of communication with the card or when the user freely executes card issuance using the user's personal portable terminal device.

The present application is based on Japanese Patent Application No. 2005-003596 filed on Jan. 11, 2005, the entire content of which is expressly incorporated by reference herein.

INDUSTRIAL APPLICABILITY

The secure device of the present invention has effects of reducing influences by interruptions of communication with an external device and allowing a user to speedily and safely incorporate a desired application program and is suitable for use as a secure device that carries out card issuance processing under instructions from the external device with which the secure device is connected and communicating.

The invention claimed is:

1. A secure device that executes card issuance in response to a command from an external device, the secure device comprising:
   a card issuance section that extracts a card issuance command corresponding to a function of a card to be acquired from-command groups stored in an internal memory; and
   a card management section that executes the card issuance command extracted by said card issuance section,
   the card issuance comprises:
      outputting the card issuance command from said card issuance section to said card management section, executing the card issuance command by said card management section, and outputting a response from said card management section to said card issuance section, indicating that the card issuance execution is completed, and
   wherein card issuance is executed only by communication within said secure device after receiving the command from said external device.

2. The secure device according to claim 1, wherein the command group is written by direct access from an external device to the internal memory.

3. The secure device according to claim 1, wherein said card management section starts to execute the card issuance command based on a request from an external device and sends a response to the external device indicating whether or not the card issuance has been successful.

4. The secure device according to claim 3, wherein said card issuance section monitors whether or not each card issuance command has been successfully executed at said card management section and outputs, to said card management section, when some card issuance commands have not been successfully executed, information to identify card issuance commands that have been successfully executed, and
   said card management section sends a response to the external device including information indicating that some card issuance commands have not been successfully executed and identifying the card issuance commands that have been successfully executed.

5. The secure device according to claim 3, wherein said card management section stores an interruption history in executing the card issuance command, reports, to said card issuance section, a first card issuance command which has not sent any response to the external device, and
   said card issuance section identifies a card issuance command to be executed first from the interruption history and the first card issuance command which has not sent any response to the external device and restarts execution of the card issuance command.

6. The secure device according to claim 1, further comprising a privileged mode management section that sets a privileged mode which prevents communication between said card management section and an external device, wherein said privileged mode management section sets the privileged mode at a time at which execution of the card issuance command begins.

7. The secure device according to claim 6, wherein said card issuance section determines whether or not all card issuance commands have been successfully executed at said card management section, outputs a privileged mode cancellation request to said privileged mode management section when said card issuance section determines that all card issuance commands have been successfully executed or decides that some card issuance commands have not been successfully executed, and said privileged mode management section cancels the privileged mode when the privileged mode cancellation request is input from said card issuance section.

8. The secure device according to claim 1, wherein said card issuance section comprises a direct reference section that directly refers to the command groups stored in the internal memory, and said card management section executes the card issuance command through the direct reference section.

9. The secure device according to claim 1, wherein said card management section comprises a file management table to identify a file for storing a plurality of command groups corresponding to a plurality of card functions stored in the internal memory and executes a card issuance command which relates to a command group stored in a file specified by the external device.

10. An IC card issuance system comprising a secure device and an external device that communicates with the secure device, wherein said external device comprises a command generator that generates a request command requesting card issuance and a command sender that sends the generated request command to said secure device, and said secure device comprises a card issuance section that extracts a card issuance command corresponding to a function of a card to be acquired from command groups stored in an internal memory and a card management section that executes, when the request command is input, the card issuance command extracted by said card issuance section, wherein said card management section of said secure device sends a response to said external device indicating whether or not the card issuance has been successful and said external device comprises a response receiver that receives the response and a self-issuance management section that analyzes the response, ends card issuance when the response indicates that card issuance has been successful and outputs an instruction for resending the request command to said command generator when the response does not indicate that card issuance has been successful.

11. The IC card issuance system according to claim 10, wherein said card issuance section of said secure device monitors whether or not each card issuance command has been successfully executed at said card management section and outputs to said card management section, when some card issuance commands have not been successfully executed, information that identifies the card issuance commands that have been successfully executed, said card management section of said secure device sends, to the external device, a response including information indicating that some card issuance commands have not been successfully executed and identifying the card issuance commands that have been successfully executed, and said self-issuance management section of said external device analyzes the response and outputs an instruction to said command generator for sending a request command for starting card issuance by executing the card issuance commands that have not been successfully executed.

12. A secure device comprising:

a card issuance section that extracts a card issuance command corresponding to a function of a card to be acquired from command groups stored in an internal memory;

a card management section that executes the card issuance command extracted by said card issuance section; and a privileged mode management section that sets a privileged mode which prevents communication between said card management section and an external device, wherein said privileged mode management section sets the privileged mode at a time at which execution of the card issuance command begins.

13. The secure device according to claim 12, wherein said card issuance section determines whether or not all card issuance commands have been successfully executed at said card management section, outputs a privileged mode cancellation request to said privileged mode management section when said card issuance section determines that all card issuance commands have been successfully executed or determines that some card issuance commands have not been successfully executed, and said privileged mode management section cancels the privileged mode when the privileged mode cancellation request is input from said card issuance section.

14. The secure device according to claim 12, wherein the command group is written by direct access from an external device to the internal memory.

15. The secure device according to claim 12, wherein said card management section starts to execute the card issuance command based on a request from an external device and sends a response to the external device indicating whether or not the card issuance has been successful.

16. The secure device according to claim 12, wherein said card issuance section monitors whether or not each card issuance command has been successfully executed at said card management section and outputs, when some card issuance commands have not been successfully executed, information to identify card issuance commands that have been successfully executed to said card management section, and said card management section sends a response including information indicating that some card issuance commands have not been successfully executed and identifying the card issuance commands that have been successfully executed to the external device.

17. The secure device according to claim 12, wherein said card issuance section comprises a direct reference section that directly refers to the command groups stored in the internal memory, and said card management section executes the card issuance command through the direct reference section.

18. The secure device according to claim 12, wherein said card management section comprises a file management table to identify a file for storing a plurality of command groups corresponding to a plurality of card functions stored in the internal memory and executes a card issuance command which relates to a command group stored in a file specified by the external device.

19. A secure device comprising:
- a card issuance section that extracts a card issuance command corresponding to a function of a card to be acquired from command groups stored in an internal memory; and
- a card management section that executes the card issuance command extracted by said card issuance section,
- wherein said card management section starts to execute the card issuance command based on a request from an external device and sends a response to the external device indicating whether or not the card issuance has been successful,
- wherein said card management section stores an interruption history in executing the card issuance command, reports to said card issuance section a first card issuance command which has not sent any response to the external device and
- said card issuance section identifies a card issuance command to be executed first from the interruption history and the first card issuance command which has not sent any response to the external device and restarts execution of the card issuance command.

20. A secure device comprising:
- a card issuance section that extracts a card issuance command corresponding to a function of a card to be acquired from command groups stored in an internal memory; and
- a card management section that executes the card issuance command extracted by said card issuance section,
- wherein said card management section starts to execute the card issuance command based on a request from an external device and sends a response, to the external device, indicating whether or not the card issuance has been successful,
- wherein said card issuance section monitors whether or not each card issuance command has been successfully executed at said card management section and outputs, to said card management section, when some card issuance commands have not been successfully executed, information to identify up to which card issuance command the execution has been successful, and
- said card management section sends a response to the external device including information indicating that some card issuance commands have not been successfully executed and identifying the card issuance commands that have been successfully executed.

* * * * *

UNITED STATES PATENT AND TRADEMARK OFFICE
CERTIFICATE OF CORRECTION

PATENT NO. : 7,428,992 B2  Page 1 of 1
APPLICATION NO. : 10/598661
DATED : September 30, 2008
INVENTOR(S) : M. Tanabiki et al.

It is certified that error appears in the above-identified patent and that said Letters Patent is hereby corrected as shown below:

On the cover of the printed patent, at Item (86), PCT No., "PCT/JP2006/000146" should be --PCT/JP2006/300146--.

Signed and Sealed this

Thirteenth Day of January, 2009

JON W. DUDAS
*Director of the United States Patent and Trademark Office*